US011375364B2

(12) United States Patent
Li et al.

(10) Patent No.: US 11,375,364 B2
(45) Date of Patent: Jun. 28, 2022

(54) BROADCAST RELAY METHOD IN NEW RADIO

(71) Applicant: QUALCOMM Incorporated, San Diego, CA (US)

(72) Inventors: Junyi Li, Chester, NJ (US); Vasanthan Raghavan, West Windsor Township, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/885,018

(22) Filed: May 27, 2020

(65) Prior Publication Data

US 2020/0382946 A1 Dec. 3, 2020

Related U.S. Application Data

(60) Provisional application No. 62/855,528, filed on May 31, 2019.

(51) Int. Cl.
*H04W 40/22* (2009.01)
*H04W 8/24* (2009.01)
(Continued)

(52) U.S. Cl.
CPC .......... *H04W 8/245* (2013.01); *H04W 24/08* (2013.01); *H04W 28/0268* (2013.01);
(Continued)

(58) Field of Classification Search
CPC ................ H04W 8/245; H04W 24/08; H04W 28/0268; H04W 48/10; H04W 48/20;
(Continued)

(56) References Cited

U.S. PATENT DOCUMENTS

| 9,369,914 | B1* | 6/2016 | Shirali | .............. H04W 28/0236 |
| 2010/0260088 | A1 | 10/2010 | Jeon | |
| 2013/0021962 | A1* | 1/2013 | Hu | ......................... H04W 48/20 370/315 |
| 2013/0237228 | A1* | 9/2013 | Womack | ............... H04W 36/08 455/436 |
| 2015/0038136 | A1* | 2/2015 | Wu | ....................... H04W 48/08 455/434 |

(Continued)

FOREIGN PATENT DOCUMENTS

| WO | WO-2018144081 A1 | 8/2018 |
| WO | WO-2018204695 A1 | 11/2018 |

OTHER PUBLICATIONS

Partial International Search Report—PCT/US2020/034855—ISA/EPO—dated Aug. 4, 2020.
(Continued)

*Primary Examiner* — Said M Elnoubi
(74) *Attorney, Agent, or Firm* — Holland & Hart LLP/Qualcomm Incorporated

(57) ABSTRACT

Methods, systems, and devices for wireless communications are described. A user equipment (UE) may receive, from a broadcast transmitter, a broadcast signal including one or more multi-resolution messages. The UE may decode at least one of the one or more multi-resolution messages based on receiving the broadcast signal from the broadcast transmitter, and may determine that a data rate associated with the broadcast signal is less than a threshold based on the decoding. The UE may transmit a signal querying the broadcast reception capability of a base station based on determining the data rate. In response to the query signal, the UE may receive a signal indicating a broadcast reception capability of the base station, and may communicate, with the base station, based on the broadcast reception capability of the base station.

65 Claims, 19 Drawing Sheets

(51) Int. Cl.
*H04W 24/08* (2009.01)
*H04W 28/02* (2009.01)
*H04W 48/10* (2009.01)
*H04W 48/20* (2009.01)
*H04W 72/00* (2009.01)
*H04W 72/04* (2009.01)

(52) U.S. Cl.
CPC ........... *H04W 48/10* (2013.01); *H04W 48/20* (2013.01); *H04W 72/005* (2013.01); *H04W 72/0446* (2013.01)

(58) Field of Classification Search
CPC ........... H04W 72/005; H04W 72/0446; H04W 40/36; H04W 40/12; H04W 40/22; H04W 4/70; H04W 4/00; H04W 48/14; H04W 72/042; H04W 84/047; H04W 48/12; Y02D 30/70
See application file for complete search history.

(56) References Cited

U.S. PATENT DOCUMENTS

| | | | |
|---|---|---|---|
| 2017/0237817 A1* | 8/2017 | Sharma | H04W 48/10 370/331 |
| 2017/0265166 A1 | 9/2017 | Hosseini et al. | |
| 2018/0027429 A1* | 1/2018 | Li | H04W 24/02 455/426.1 |
| 2018/0192255 A1 | 7/2018 | Guo et al. | |
| 2018/0199163 A1 | 7/2018 | Chen et al. | |
| 2018/0270893 A1 | 9/2018 | Patel et al. | |
| 2019/0124696 A1 | 4/2019 | Islam et al. | |
| 2019/0182140 A1* | 6/2019 | Tenny | H04L 41/12 |

OTHER PUBLICATIONS

International Search Report and Written Opinion—PCT/US2020/034855—ISA/EPO—dated Nov. 17, 2020.

* cited by examiner

BROADCAST RELAY METHOD IN NEW RADIO

CROSS REFERENCE

The present application for patent claims the benefit of U.S. Provisional Patent Application No. 62/855,528 by LI et al., entitled "BROADCAST RELAY METHOD IN NEW RADIO," filed May 31, 2019, assigned to the assignee hereof, and expressly incorporated by reference herein.

INTRODUCTION

The following relates generally to wireless communications, and more specifically to techniques for relaying messages in a wireless communications network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as new radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems (e.g., NR systems), a UE may receive broadcast signal from a broadcast transmitter. Current techniques for reception of broadcast signals, in some instances, however, may be deficient.

SUMMARY

A method of wireless communication at a UE is described. The method may include receiving a signal indicating a broadcast reception capability of the base station and communicating, with the base station, based on the broadcast reception capability of the base station.

A method of wireless communication at a UE is described. The method may include receiving, from a broadcast transmitter, a broadcast signal including one or more multi-resolution messages. The method may also include receiving a signal indicating a broadcast reception capability of the base station and communicating, with the base station, based on the broadcast reception capability of the base station.

An apparatus for wireless communication at a UE is described. The apparatus may include a processor and a memory coupled with the processor. The processor and memory configured to cause the apparatus to receive, from a broadcast transmitter, a broadcast signal including one or more multi-resolution messages and receive a signal indicating a broadcast reception capability of the base station. The processor and memory further configured to cause the apparatus to communicate, with the base station, based on the broadcast reception capability of the base station.

Another apparatus for wireless communication at a UE is described. The apparatus may include means for receiving, from a broadcast transmitter, a broadcast signal including one or more multi-resolution messages and means for receiving a signal indicating a broadcast reception capability of the base station. The apparatus may also include means for communicating, with the base station, based on the broadcast reception capability of the base station.

A non-transitory computer-readable medium storing code for wireless communication at a UE is described. The code may include instructions executable by a processor to receive, from a broadcast transmitter, a broadcast signal including one or more multi-resolution messages and receive a signal indicating a broadcast reception capability of the base station. The code may include instructions executable by a processor to communicate, with the base station, based on the broadcast reception capability of the base station.

Some examples of the method, apparatuses, and non-transitory computer-readable medium described herein may further include operations, features, means, or instructions for transmitting a second signal querying the broadcast reception capability of a base station in response to receiving the broadcast signal from the broadcast transmitter.

Some examples of the method, apparatuses, and non-transitory computer-readable medium described herein may further include operations, features, means, or instructions for decoding at least one of the one or more multi-resolution messages based on receiving the broadcast signal from the broadcast transmitter. The examples may also include determining that a data rate associated with the broadcast signal may be less than a threshold based on decoding the at least one of the one or more multi-resolution messages, where transmitting the second signal may be based on the determining.

In some examples of the method, apparatuses, and non-transitory computer-readable medium described herein, receiving the signal further may include operations, features, means, or instructions for receiving, from the base station, the signal indicating that the base station includes a capability to receive the broadcast signal from the broadcast transmitter.

Some examples of the method, apparatuses, and non-transitory computer-readable medium described herein may further include operations, features, means, or instructions for determining a link quality between the base station and the UE based on receiving the signal, and selecting the base station for reception of the broadcast signal based on the determined link quality, where communicating with the base station may be based on the selecting.

In some examples of the method, apparatuses, and non-transitory computer-readable medium described herein, receiving the signal further may include operations, features, means, or instructions for receiving, from the base station, the signal indicating that the base station may be incapable of receiving the broadcast signal from the broadcast transmitter.

Some examples of the method, apparatuses, and non-transitory computer-readable medium described herein may further include operations, features, means, or instructions for transmitting, to a second base station, a second signal querying the broadcast reception capability of the second base station. The examples may also include receiving, from the second base station, a third signal indicating that the second base station includes a capability to receive the broadcast signal from the broadcast transmitter.

Some examples of the method, apparatuses, and non-transitory computer-readable medium described herein may further include operations, features, means, or instructions for determining a first link quality between the base station and the UE based on receiving the signal, determining a second link quality between the second base station and the UE based on receiving the third signal, and selecting the base station for reception of the broadcast signal based on the first link quality and the second link quality, where the second base station relays the broadcast signal to the base station. In some examples of the method, apparatuses, and non-transitory computer-readable medium described herein, the first link quality may be greater than the second link quality.

Some examples of the method, apparatuses, and non-transitory computer-readable medium described herein may further include operations, features, means, or instructions for determining a link quality between the second base station and the UE based on receiving the third signal, and performing a handover procedure to establish a connection with the second base station based on the link quality satisfying a threshold. In some examples of the method, apparatuses, and non-transitory computer-readable medium described herein, the signal and the second signal may be the same signal. In some examples of the method, apparatuses, and non-transitory computer-readable medium described herein, the signal and the second signal may be different signals.

Some examples of the method, apparatuses, and non-transitory computer-readable medium described herein may further include operations, features, means, or instructions for transmitting, to a central entity, a second signal querying the broadcast reception capability of the base station, where the second signal includes an indication of a link quality between the base station and the UE.

In some examples of the method, apparatuses, and non-transitory computer-readable medium described herein, receiving the signal further may include operations, features, means, or instructions for receiving, from the central entity, the signal indicating that the base station includes a capability to receive the broadcast signal from the broadcast transmitter. In some examples of the method, apparatuses, and non-transitory computer-readable medium described herein, the broadcast reception capability at the base station may be based on at least one of a circuitry included in the base station, a broadcast reception quality at the base station, a current load at the base station, or a combination thereof.

In some examples of the method, apparatuses, and non-transitory computer-readable medium described herein, the broadcast transmitter includes a new radio broadcast transmitter and the base station includes a new radio small cell. In some examples of the method, apparatuses, and non-transitory computer-readable medium described herein, a distance between the broadcast transmitter and the UE may be greater than a distance between the base station and the UE. In some examples of the method, apparatuses, and non-transitory computer-readable medium described herein, a power of a broadcast transmitter is higher than a power of the base station.

Some examples of the method, apparatuses, and non-transitory computer-readable medium described herein may further include operations, features, means, or instructions for transmitting a query to the base station regarding the broadcast reception capability of the base station, wherein receiving the signal indicating the broadcast reception capability of the base station is in response to the query.

Some examples of the method, apparatuses, and non-transitory computer-readable medium described herein may further include operations, features, means, or instructions for receiving, from a broadcast transmitter, a broadcast signal comprising one or more multi-resolution messages and receiving, from the base station, a configuration signal indicating a transmission mode of the base station. The method, apparatuses, and non-transitory computer-readable medium described herein may further include operations, features, means, or instructions for monitoring at least a portion of a time slot for reception of a relay signal from the base station based at least in part on the transmission mode of the base station, wherein the relay signal includes a relay of the broadcast signal transmitted from the broadcast transmitter to the base station and receiving, from the base station, the relay signal based at least in part on the monitored portion of the time slot.

In some examples of the method, apparatuses, and non-transitory computer-readable medium described herein, monitoring at least the portion of the time slot further includes identifying a start time for reception of the relay signal from the base station based at least in part on the transmission mode of the base station and initiating the monitoring of the time slot at the identified start time for reception of the relay signal from the base station.

In some examples of the method, apparatuses, and non-transitory computer-readable medium described herein, monitoring at least the portion of the time slot further includes monitoring one or more time instances for reception of a physical downlink control channel based at least in part on the transmission mode of the base station. The method, apparatuses, and non-transitory computer-readable medium described herein may further include operations, features, means, or instructions for receiving, from the base station, the physical downlink control channel based at least in part on monitoring the one or more time instances and initiating monitoring at least the portion of the time slot for reception of the relay signal from the base station based at least in part on receiving the physical downlink control channel.

A method of wireless communication at a UE is described. The method may include receiving, from a base station, a configuration signal indicating a transmission mode of the base station. The method may also include monitoring at least a portion of a time slot for reception of a relay signal from the base station based on the transmission mode of the base station, where the relay signal includes a relay of a broadcast signal transmitted from a broadcast transmitter. The method may also include receiving, from the base station, the relay signal based on monitoring the portion of the time slot.

An apparatus for wireless communication at a UE is described. The apparatus may include a processor and memory coupled with the processor. The processor and memory configured to cause the apparatus to receive, from a base station, a configuration signal indicating a transmission mode of the base station. The processor and memory further configured to cause the apparatus to monitor at least a portion of a time slot for reception of a relay signal from the base station based on the transmission mode of the base station, where the relay signal includes a relay of a broadcast signal transmitted from a broadcast transmitter. The processor and memory further configured to cause the apparatus toto cause the apparatus to receive, from the base station, the relay signal based on monitoring the portion of the time slot.

Another apparatus for wireless communication at a UE is described. The apparatus may include means for receiving, from a base station, a configuration signal indicating a transmission mode of the base station. The apparatus may also include means for monitoring at least a portion of a time slot for reception of a relay signal from the base station based on the transmission mode of the base station, where the relay signal includes a relay of a broadcast signal transmitted from a broadcast transmitter. The apparatus may also include means for receiving, from the base station, the relay signal based on monitoring the portion of the time slot.

A non-transitory computer-readable medium storing code for wireless communication at a UE is described. The code may include instructions executable by a processor to receive, from a base station, a configuration signal indicating a transmission mode of the base station, monitor at least a portion of a time slot for reception of a relay signal from the base station based on the transmission mode of the base station, where the relay signal includes a relay of a broadcast signal transmitted from a broadcast transmitter, and receive, from the base station, the relay signal based on monitoring the portion of the time slot.

In some examples of the method, apparatuses, and non-transitory computer-readable medium described herein, monitoring at least the portion of the time slot further may include operations, features, means, or instructions for identifying a start time for reception of the relay signal from the base station based on the transmission mode of the base station, and initiating the monitoring of the time slot at the identified start time for reception of the relay signal from the base station.

In some examples of the method, apparatuses, and non-transitory computer-readable medium described herein, monitoring at least the portion of the time slot further may include operations, features, means, or instructions for receiving, from the base station, a physical downlink control channel based on the transmission mode of the base station, and initiating monitoring at least the portion of the time slot for reception of the relay signal from the base station based on receiving the physical downlink control channel.

Some examples of the method, apparatuses, and non-transitory computer-readable medium described herein may further include operations, features, means, or instructions for monitoring one or more time instances for reception of the physical downlink control channel based on the transmission mode of the base station, where receiving the physical downlink control channel may be further based on monitoring the one or more time instances. In some examples of the method, apparatuses, and non-transitory computer-readable medium described herein, the one or more time instances may be identified based on at least one of the transmission mode of the base station, the configuration signal, or a combination thereof.

Some examples of the method, apparatuses, and non-transitory computer-readable medium described herein may further include operations, features, means, or instructions for receiving, from the broadcast transmitter, the broadcast signal including one or more multi-resolution messages, decoding at least one of the one or more multi-resolution messages based on receiving the broadcast signal from the broadcast transmitter, and selecting the base station for reception of the broadcast signal based on decoding the at least one of the one or more multi-resolution messages, where a broadcast reception capability at the base station, where receiving the relay signal from the base station may be based on selecting the base station. In some examples of the method, apparatuses, and non-transitory computer-readable medium described herein, the broadcast reception capability at the base station may be based on at least one of a circuitry included in the base station, a broadcast reception quality at the base station, a current load at the base station, or a combination thereof.

Some examples of the method, apparatuses, and non-transitory computer-readable medium described herein may further include operations, features, means, or instructions for monitoring for one or more broadcast transmissions from the broadcast transmitter. In some examples of the method, apparatuses, and non-transitory computer-readable medium described herein, receiving the relay signal further may include operations, features, means, or instructions for receiving, from the base station, a beamformed transmission including the relay signal.

In some examples of the method, apparatuses, and non-transitory computer-readable medium described herein, a timing boundary associated with a reception of the relay signal may be equal to a timing boundary associated with a reception of the broadcast signal. In some examples of the method, apparatuses, and non-transitory computer-readable medium described herein, the relay signal includes an in-band signal, or an out-of-band signal, or both. In some examples of the method, apparatuses, and non-transitory computer-readable medium described herein, the relay signal may be transmitted using millimeter wave frequencies and the broadcast signal may be transmitted using sub-6 frequencies. In some examples of the method, apparatuses, and non-transitory computer-readable medium described herein, the broadcast transmitter includes a new radio broadcast transmitter and the base station includes a new radio small cell.

A method of wireless communication at a UE is described. The method may include receiving, from a broadcast transmitter, a broadcast signal including one or more multi-resolution messages and transmitting a first signal querying a broadcast reception capability of a base station in response to receiving the broadcast signal from the broadcast transmitter. The method may include receiving a second signal indicating the broadcast reception capability of the base station and receiving, from the base station, a configuration signal indicating a transmission mode of the base station. The method may also include monitoring at least a portion of a time slot for reception of a relay signal from the base station based on the transmission mode of the base station, where the relay signal includes a relay of the broadcast signal transmitted from the broadcast transmitter to the base station. The method may include receiving, from the base station, the relay signal based on the monitored portion of the time slot.

An apparatus for wireless communication at a UE is described. The apparatus may include a processor and memory coupled with the processor. The processor and memory configured to cause the apparatus to receive, from a broadcast transmitter, a broadcast signal including one or more multi-resolution messages and transmit a first signal querying a broadcast reception capability of a base station in response to receiving the broadcast signal from the broadcast transmitter. The processor and memory further configured to cause the apparatus to receive a second signal indicating the broadcast reception capability of the base station and receive, from the base station, a configuration signal indicating a transmission mode of the base station. The processor and memory configured to cause the apparatus to monitor at least a portion of a time slot for reception of a relay signal from the base station based on the transmission mode of the base station, where the relay signal includes a relay of the broadcast signal transmitted from the broadcast transmitter to the base station, and receive, from the base station, the relay signal based on the monitored portion of the time slot.

Another apparatus for wireless communication at a UE is described. The apparatus may include means for receiving, from a broadcast transmitter, a broadcast signal including one or more multi-resolution messages and means for transmitting a first signal querying a broadcast reception capability of a base station in response to receiving the broadcast signal from the broadcast transmitter. The apparatus may also include means for receiving a second signal indicating the broadcast reception capability of the base station and means for receiving, from the base station, a configuration signal indicating a transmission mode of the base station. The apparatus may include means for monitoring at least a portion of a time slot for reception of a relay signal from the base station based on the transmission mode of the base station, where the relay signal includes a relay of the broadcast signal transmitted from the broadcast transmitter to the base station, and means for receiving, from the base station, the relay signal based on the monitored portion of the time slot.

A non-transitory computer-readable medium storing code for wireless communication at a UE is described. The code may include instructions executable by a processor to receive, from a broadcast transmitter, a broadcast signal including one or more multi-resolution messages and transmit a first signal querying a broadcast reception capability of a base station in response to receiving the broadcast signal from the broadcast transmitter. The code may include instructions executable by a processor to receive a second signal indicating the broadcast reception capability of the base station and receive, from the base station, a configuration signal indicating a transmission mode of the base station. The code may include instructions executable by a processor to monitor at least a portion of a time slot for reception of a relay signal from the base station based on the transmission mode of the base station, where the relay signal includes a relay of the broadcast signal transmitted from the broadcast transmitter to the base station, and receive, from the base station, the relay signal based on the monitored portion of the time slot.

Some examples of the method, apparatuses, and non-transitory computer-readable medium described herein may further include operations, features, means, or instructions for decoding at least one of the one or more multi-resolution messages based on receiving the broadcast signal from the broadcast transmitter, and determining that a data rate associated with the broadcast signal may be less than a threshold based on decoding the at least one of the one or more multi-resolution messages, where transmitting the first signal may be based on the determining.

In some examples of the method, apparatuses, and non-transitory computer-readable medium described herein, receiving the second signal further may include operations, features, means, or instructions for receiving, from the base station, the second signal indicating that the base station includes a capability to receive the broadcast signal from the broadcast transmitter.

In some examples of the method, apparatuses, and non-transitory computer-readable medium described herein, monitoring at least the portion of the time slot further may include operations, features, means, or instructions for identifying a start time for reception of the relay signal from the base station based on the transmission mode of the base station, and initiating the monitoring of the time slot at the identified start time for reception of the relay signal from the base station.

In some examples of the method, apparatuses, and non-transitory computer-readable medium described herein, monitoring at least the portion of the time slot further may include operations, features, means, or instructions for monitoring one or more time instances for reception of a physical downlink control channel based on the transmission mode of the base station, receiving, from the base station, the physical downlink control channel based on monitoring the one or more time instances, and initiating monitoring at least the portion of the time slot for reception of the relay signal from the base station based on receiving the physical downlink control channel.

In some examples of the method, apparatuses, and non-transitory computer-readable medium described herein, receiving the second signal further may include operations, features, means, or instructions for receiving, from the base station, the second signal indicating that the base station may be incapable of receiving the broadcast signal from the broadcast transmitter.

Some examples of the method, apparatuses, and non-transitory computer-readable medium described herein may further include operations, features, means, or instructions for transmitting, to a second base station, a third signal querying the broadcast reception capability of the second base station, and receiving, from the second base station, a fourth signal indicating that the second base station includes a capability to receive the broadcast signal from the broadcast transmitter.

Some examples of the method, apparatuses, and non-transitory computer-readable medium described herein may further include operations, features, means, or instructions for determining a first link quality between the base station and the UE based on receiving the second signal, determining a second link quality between the second base station and the UE based on receiving the fourth signal, and selecting the base station for reception of the broadcast signal based on the first link quality and the second link quality, where the second base station relays the broadcast signal to the base station.

In some examples of the method, apparatuses, and non-transitory computer-readable medium described herein, the broadcast reception capability at the base station may be based on at least one of a circuitry included in the base station, a broadcast reception quality at the base station, a current load at the base station, or a combination thereof. In some examples of the method, apparatuses, and non-transitory computer-readable medium described herein, the broadcast transmitter includes a new radio broadcast transmitter and the base station includes a new radio small cell.

A method of wireless communication at a base station is described. The method may include determining a broadcast reception capability of the base station, where the broadcast reception capability includes a capability to receive a broadcast signal from a broadcast transmitter, transmitting, to the UE, a signal indicating the broadcast reception capability of the base station based on the determining, and communicating, with the UE, based on the broadcast reception capability at the base station.

An apparatus for wireless communication at a base station is described. The apparatus may include a processor and memory coupled with the processor. The processor and memory configured to cause the apparatus to determine a broadcast reception capability of the base station, where the broadcast reception capability includes a capability to receive a broadcast signal from a broadcast transmitter, transmit, to the UE, a signal indicating the broadcast reception capability of the base station based on the determining, and communicate, with the UE, based on the broadcast reception capability at the base station.

Another apparatus for wireless communication at a base station is described. The apparatus may include means for determining a broadcast reception capability of the base station, where the broadcast reception capability includes a capability to receive a broadcast signal from a broadcast transmitter, transmitting, to the UE, a signal indicating the broadcast reception capability of the base station based on the determining, and communicating, with the UE, based on the broadcast reception capability at the base station.

A non-transitory computer-readable medium storing code for wireless communication at a base station is described. The code may include instructions executable by a processor to determine a broadcast reception capability of the base station, where the broadcast reception capability includes a capability to receive a broadcast signal from a broadcast transmitter, transmit, to the UE, a signal indicating the broadcast reception capability of the base station based on the determining, and communicate, with the UE, based on the broadcast reception capability at the base station.

In some examples of the method, apparatuses, and non-transitory computer-readable medium described herein, transmitting the signal further may include operations, features, means, or instructions for determining that the base station includes a capability to receive the broadcast signal from the broadcast transmitter, and transmitting, to the UE, the signal indicating that the base station includes the capability to receive the broadcast signal from the broadcast transmitter.

In some examples of the method, apparatuses, and non-transitory computer-readable medium described herein, transmitting the signal further may include operations, features, means, or instructions for determining that the base station may be incapable of receiving the broadcast signal from the broadcast transmitter, and transmitting, to the UE, the signal indicating that the base station may be incapable of receiving the broadcast signal from the broadcast transmitter.

Some examples of the method, apparatuses, and non-transitory computer-readable medium described herein may further include operations, features, means, or instructions for determining that the base station may be incapable of receiving the broadcast signal from the broadcast transmitter, transmitting, to a second base station, a third signal querying the broadcast reception capability at the second base station, and receiving, from the second base station, a fourth signal indicating that the second base station includes a capability to receive the broadcast signal from the broadcast transmitter, where transmitting the signal may be based on receiving the fourth signal. Some examples of the method, apparatuses, and non-transitory computer-readable medium described herein may further include operations, features, means, or instructions for broadcasting the signal indicating the broadcast reception capability using a first frequency, where the broadcast signal may be received from the broadcast transmitter using a second frequency.

Some examples of the method, apparatuses, and non-transitory computer-readable medium described herein may further include operations, features, means, or instructions for receiving, from a UE, a second signal querying the broadcast reception capability of the base station, where transmitting the signal indicating the broadcast reception capability may be based on the second signal. In some examples of the method, apparatuses, and non-transitory computer-readable medium described herein, the broadcast reception capability at the base station may be based on at least one of a circuitry included in the base station, a broadcast reception quality at the base station, a current load at the base station, or a combination thereof.

In some examples of the method, apparatuses, and non-transitory computer-readable medium described herein, the broadcast transmitter includes a new radio broadcast transmitter and the base station includes a new radio small cell. In some examples of the method, apparatuses, and non-transitory computer-readable medium described herein, a distance between the broadcast transmitter and the UE may be greater than a distance between the base station and the UE.

Some examples of the method, apparatuses, and non-transitory computer-readable medium described herein may further include operations, features, means, or instructions for receiving, from the user equipment, a first signal querying the broadcast reception capability of the base station, wherein transmitting the signal indicating the broadcast reception capability is based on receiving the first signal. The operations, features, means, or instructions may further include transmitting, to the user equipment, a configuration signal indicating a transmission mode of the base station and transmitting, to the user equipment, a relay signal within at least a portion of a time slot based at least in part on the transmission mode of the base station.

Some examples of the method, apparatuses, and non-transitory computer-readable medium described herein may further include operations, features, means, or instructions for configuring the user equipment to identify a start time for reception of the relay signal from the base station based at least in part on the transmission mode of the base station and configuring the user equipment to initiate monitoring of the time slot at the identified start time for reception of the relay signal from the base station.

Some examples of the method, apparatuses, and non-transitory computer-readable medium described herein may further include operations, features, means, or instructions for transmitting, to the user equipment, a physical downlink control channel based at least in part on the transmission mode of the base station and configuring the user equipment to initiate monitoring at least the portion of the time slot for reception of the relay signal from the base station based at least in part on receiving the physical downlink control channel.

A method of wireless communication at a base station is described. The method may include transmitting, to a UE, a configuration signal indicating a transmission mode of the base station. The method may also include receiving a broadcast signal based on a broadcast reception capability at the base station, the broadcast signal including one or more systematic information bits and one or more redundancy coding bits, and transmitting, to the UE, a relay signal within at least a portion of a time slot based on the transmission mode of the base station, where the relay signal includes a relay of the broadcast signal received from the broadcast transmitter.

An apparatus for wireless communication at a base station is described. The apparatus may include a processor and memory coupled with the processor. The processor and memory configured to cause the apparatus to transmit, to a UE, a configuration signal indicating a transmission mode of the base station, receive a broadcast signal based on a broadcast reception capability at the base station, the broadcast signal including one or more systematic information bits and one or more redundancy coding bits, and transmit, to the UE, a relay signal within at least a portion of a time slot based on the transmission mode of the base station, where the relay signal includes a relay of the broadcast signal received from the broadcast transmitter.

Another apparatus for wireless communication at a base station is described. The apparatus may include means for transmitting, to a UE, a configuration signal indicating a transmission mode of the base station, receiving a broadcast signal based on a broadcast reception capability at the base station, the broadcast signal including one or more systematic information bits and one or more redundancy coding bits, and transmitting, to the UE, a relay signal within at least a portion of a time slot based on the transmission mode of the base station, where the relay signal includes a relay of the broadcast signal received from the broadcast transmitter.

A non-transitory computer-readable medium storing code for wireless communication at a base station is described. The code may include instructions executable by a processor to transmit, to a UE, a configuration signal indicating a transmission mode of the base station, receive a broadcast signal based on a broadcast reception capability at the base station, the broadcast signal including one or more systematic information bits and one or more redundancy coding bits, and transmit, to the UE, a relay signal within at least a portion of a time slot based on the transmission mode of the base station, where the relay signal includes a relay of the broadcast signal received from the broadcast transmitter.

Some examples of the method, apparatuses, and non-transitory computer-readable medium described herein may further include operations, features, means, or instructions for configuring the UE to identify a start time for reception of the relay signal from the base station based on the transmission mode of the base station, and configuring the UE to initiate monitoring of the time slot at the identified start time for reception of the relay signal from the base station.

Some examples of the method, apparatuses, and non-transitory computer-readable medium described herein may further include operations, features, means, or instructions for transmitting, to the UE, a physical downlink control channel based on the transmission mode of the base station, where the physical downlink control channel may be transmitted in a time instance identified in the configuration signal, and configuring the UE to initiate monitoring at least the portion of the time slot for reception of the relay signal from the base station based on receiving the physical downlink control channel.

In some examples of the method, apparatuses, and non-transitory computer-readable medium described herein, the broadcast reception capability at the base station may be based on at least one of a circuitry included in the base station, a broadcast reception quality at the base station, a current load at the base station, or a combination thereof. In some examples of the method, apparatuses, and non-transitory computer-readable medium described herein, transmitting the relay signal further may include operations, features, means, or instructions for transmitting, to the UE, a beam-formed transmission including the relay signal.

In some examples of the method, apparatuses, and non-transitory computer-readable medium described herein, a timing boundary associated with a transmission of the relay signal may be equal to a timing boundary associated with a reception of the broadcast signal. In some examples of the method, apparatuses, and non-transitory computer-readable medium described herein, the broadcast signal may be received from at least one of a broadcast transmitter, a second base station, or a combination thereof. In some examples of the method, apparatuses, and non-transitory computer-readable medium described herein, the relay signal includes an in-band signal, or an out-of-band signal, or both.

In some examples of the method, apparatuses, and non-transitory computer-readable medium described herein, the relay signal may be transmitted using millimeter wave frequencies and the broadcast signal may be transmitted using sub-6 frequencies. In some examples of the method, apparatuses, and non-transitory computer-readable medium described herein, the broadcast transmitter includes a new radio broadcast transmitter and the base station includes a new radio small cell.

A method of wireless communication at a base station is described. The method may include receiving, from a UE, a first signal querying a broadcast reception capability of the base station and determining whether the base station includes a capability to receive a broadcast signal from a broadcast transmitter. The method may also include transmitting, to the UE, a second signal indicating the broadcast reception capability of the base station based on the determining, transmitting, to the UE, a configuration signal indicating a transmission mode of the base station, and transmitting, to the UE, a relay signal within at least a portion of a time slot based on the transmission mode of the base station.

An apparatus for wireless communication at a base station is described. The apparatus may include a processor and memory coupled with the processor. The processor and memory configured to cause the apparatus to receive, from a UE, a first signal querying a broadcast reception capability of the base station, determine whether the base station includes a capability to receive a broadcast signal from a broadcast transmitter, transmit, to the UE, a second signal indicating the broadcast reception capability of the base station based on the determining, transmit, to the UE, a configuration signal indicating a transmission mode of the base station, and transmit, to the UE, a relay signal within at least a portion of a time slot based on the transmission mode of the base station.

Another apparatus for wireless communication at a base station is described. The apparatus may include means for receiving, from a UE, a first signal querying a broadcast reception capability of the base station, determining whether the base station includes a capability to receive a broadcast signal from a broadcast transmitter, transmitting, to the UE, a second signal indicating the broadcast reception capability of the base station based on the determining, transmitting, to the UE, a configuration signal indicating a transmission mode of the base station, and transmitting, to the UE, a relay signal within at least a portion of a time slot based on the transmission mode of the base station.

A non-transitory computer-readable medium storing code for wireless communication at a base station is described. The code may include instructions executable by a processor to receive, from a UE, a first signal querying a broadcast reception capability of the base station, determine whether the base station includes a capability to receive a broadcast signal from a broadcast transmitter, transmit, to the UE, a second signal indicating the broadcast reception capability of the base station based on the determining, transmit, to the UE, a configuration signal indicating a transmission mode of the base station, and transmit, to the UE, a relay signal within at least a portion of a time slot based on the transmission mode of the base station.

Some examples of the method, apparatuses, and non-transitory computer-readable medium described herein may further include operations, features, means, or instructions for receiving, from the broadcast transmitter, the broadcast signal based on the broadcast reception capability at the base station, where the relay signal includes a relay of the broadcast signal received from the broadcast transmitter. In some examples of the method, apparatuses, and non-transitory computer-readable medium described herein, transmitting the second signal further may include operations, features, means, or instructions for transmitting, to the UE, the second signal indicating that the base station includes the capability to receive the broadcast signal from the broadcast transmitter.

Some examples of the method, apparatuses, and non-transitory computer-readable medium described herein may further include operations, features, means, or instructions for configuring the UE to identify a start time for reception of the relay signal from the base station based on the transmission mode of the base station, and configuring the UE to initiate monitoring of the time slot at the identified start time for reception of the relay signal from the base station. Some examples of the method, apparatuses, and non-transitory computer-readable medium described herein may further include operations, features, means, or instructions for transmitting, to the UE, a physical downlink control channel based on the transmission mode of the base station, and configuring the UE to initiate monitoring at least the portion of the time slot for reception of the relay signal from the base station based on receiving the physical downlink control channel.

In some examples of the method, apparatuses, and non-transitory computer-readable medium described herein, the broadcast reception capability at the base station may be based on at least one of a circuitry included in the base station, a broadcast reception quality at the base station, a current load at the base station, or a combination thereof. In some examples of the method, apparatuses, and non-transitory computer-readable medium described herein, the broadcast transmitter includes a new radio broadcast transmitter and the base station includes a new radio small cell.

DETAILED DESCRIPTION

Figure 1:
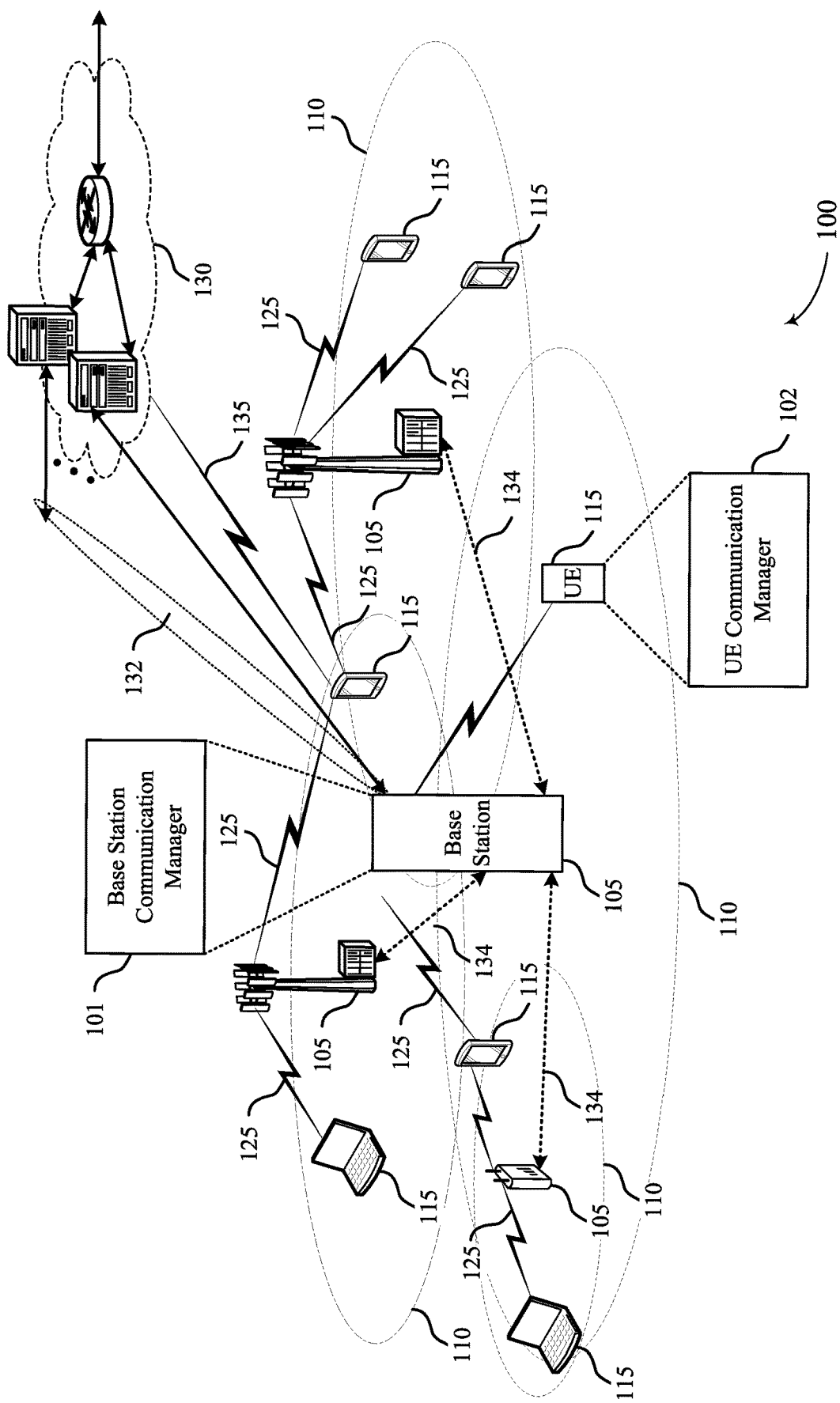
FIG. 1 illustrates an example of a wireless communications system that supports broadcast relay method in NR in accordance with one or more aspects of the present disclosure.

A UE and one or more base stations in a wireless communications system, such as an NR system, may support a broadcast relay method. A wireless communications system may include a broadcast transmitter which transmits one or more broadcast signals. In some examples, the broadcast transmitter may be referred to as an NR broadcast transmitter. In one example, a broadcast signal may include one or more multi-resolution messages. For example, the broadcast signal may include multiple messages, each message being associated with a level of resolution. In some instances, a UE may receive one or more broadcast transmissions (such as broadcast signals including the one or more multi-resolution messages) from the broadcast transmitter. In some cases, the UE may be unable to successfully decode the broadcast signal. For example, if the UE is located more than a threshold distance from the broadcast transmitter, the UE may be unable to decode the one or more multi-resolution messages. In one instance, the UE may be able to decode a low-resolution message (such as, a low resolution broadcast content) among the one or more multi-resolution messages. In some implementations, the wireless communications system may support improved broadcasting procedures in NR.

According to one or more aspects of the present disclosure, the UE, while receiving the broadcast signal from the broadcast transmitter, may connect to a nearby base station and may determine whether the base station includes a capability to relay the broadcast signal. In some implementations, the UE may receive a broadcast signal from a broadcast transmitter. Upon receiving the broadcast signal, the UE may attempt to decode the broadcast signal. For example, the UE may decode at least one of the one or more multi-resolution messages included in the broadcast signal. In one example, the UE may determine that a data rate associated with the broadcast signal is less than a threshold based on decoding the at least one of the one or more multi-resolution messages. If the UE determines that the decoded message includes a low data content, the UE may transmit a signal querying a broadcast reception capability of a nearby base station. For example, the UE may determine that the UE is connected to the base station. Upon identifying the connected base station, the UE may query the base station to determine whether the base station has the capability to receive a broadcast signal. The base station may receive the query signal, and may determine whether the base station includes the capability to receive a broadcast transmission from the broadcast transmitter. If the base station determines that the base station has the capability to receive the broadcast signal, the base station may indicate the broadcast reception capability to the UE. In some implementations, upon receiving the indication from the base station, the UE may determine a link quality between the base station and the UE. In some cases, the UE may select the base station for relaying the broadcast signal if the link quality exceeds a threshold value.

According to some aspects of the present disclosure, upon selecting a base station for receiving a relay signal, the UE may receive a configuration signal indicating a transmission mode of a base station. For example, the UE may receive a radio resource control signal from the selected base station. In some implementations, a start time of the transmission mode of the base station may be indicated to the UE using the configuration signal. Alternatively, a start time of transmission of the relay signal may be flexible. In such cases, the UE may be configured to monitor multiple instances for reception of the relay signal from the base station. In some cases, the relay signal is a relay of a broadcast signal transmitted from the broadcast transmitter. The base station may receive the broadcast signal from the broadcast transmitter, and may transmit the broadcast signal to the UE according to a transmission mode of the base station.

Aspects of the disclosure are initially described in the context of a wireless communications system. Aspects of the disclosure are further illustrated by and described with reference to apparatus diagrams, system diagrams, and flowcharts that relate to broadcast relay method in NR.

FIG. 1 illustrates an example of a wireless communications system 100 that supports broadcast relay method in NR in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are incapable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Conventional wireless communications system support broadcast reception from a broadcast transmitter. Existing wireless communications system may include a broadcast transmitter which transmits one or more broadcast signals. In one example, a broadcast signal may include one or more multi-resolution messages. In some instances, a UE may receive one or more broadcast transmissions (such as broadcast signals) from the broadcast transmitter. If the UE is located more than a threshold distance from the broadcast transmitter, the UE may be unable to successfully decode the one or more multi-resolution messages. Thus, improved broadcasting techniques may be desired.

According to one or more aspects of the present disclosure, a UE 115 may include a UE communication manager 102. While receiving the broadcast signal from the broadcast transmitter, the UE communication manager 102 may connect to a nearby base station 105. The UE communication manager 102 may determine whether the base station 105 includes a capability to relay the broadcast signal. In some cases, the UE communication manager 102 may transmit a signal to the base station 105 querying a broadcast reception capability at the base station 105. For example, the UE communication manager 102 may determine that the UE 115 is within a coverage area of a base station 105. Upon identifying the base station 105, the UE communication manager 102 may query the base station 105 to determine whether the base station 105 has a capability to receive a broadcast signal.

According to some aspects of the present disclosure, the base station communication manager 101 included in the base station 105, may determine a broadcast reception capability of the base station. In some cases, the broadcast reception capability may include a capability to receive a broadcast signal from a broadcast transmitter. The base station communication manager 101 may receive a signal querying the broadcast reception capability from UE communication manager 102. In response to receiving the signal, the base station communication manager 101 may determine the broadcast reception capability. In some cases, the base station communication manager 101 may transmit a signal indicating the broadcast reception capability of the base station based on determining the broadcast reception capability. The base station communication manager 101 may communicate with the UE 115 based on the broadcast reception capability at the base station 105.

Figure 2:
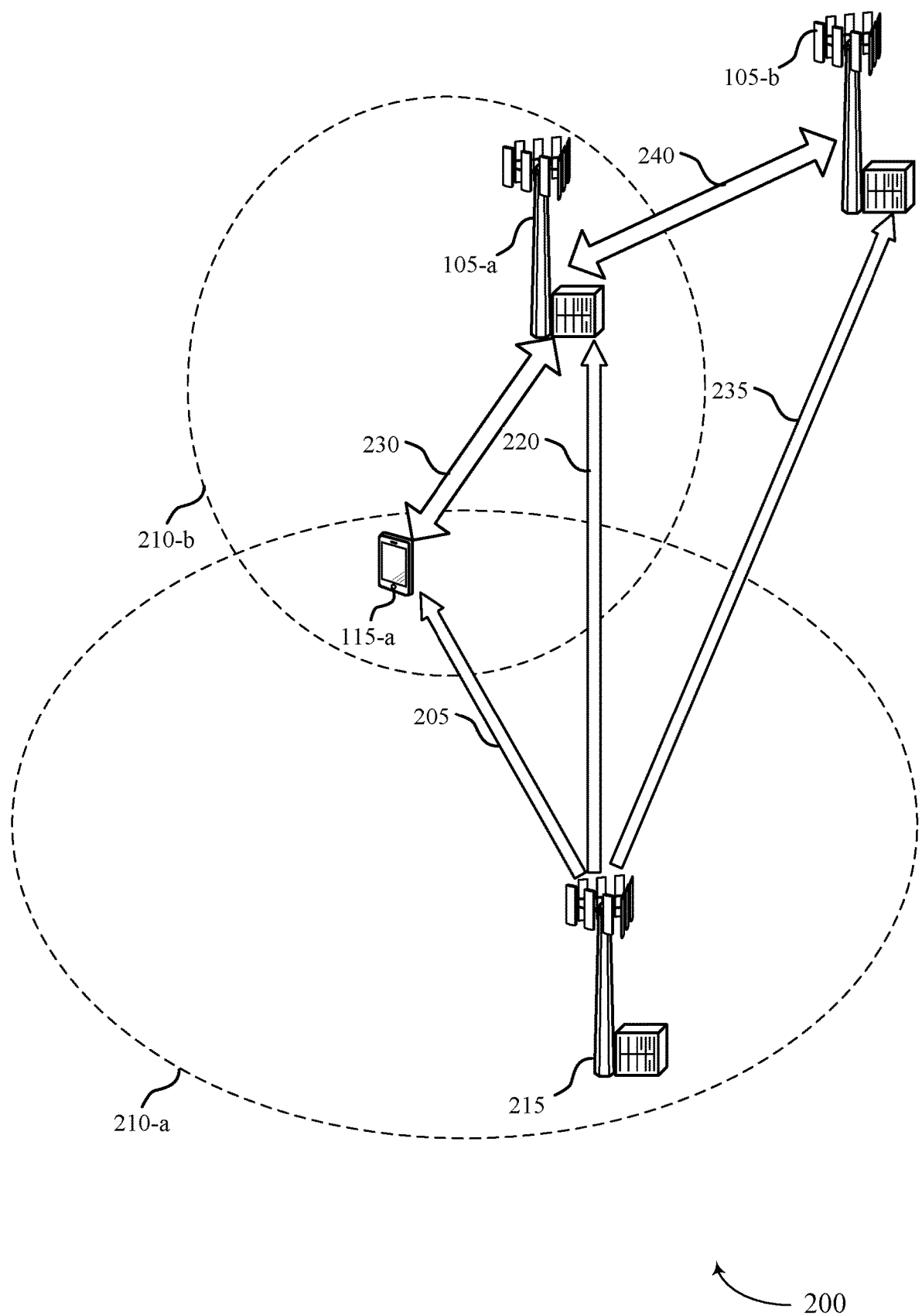
FIG. 2 illustrates an example of a wireless communications system that supports broadcast relay method in NR in accordance with one or more aspects of the present disclosure.

FIG. 2 illustrates an example of a wireless communications system 200 that supports broadcast relay method in NR in accordance with one or more aspects of the present disclosure. In some examples, wireless communications system 200 may implement aspects of wireless communications system 100. The wireless communications system 200 may include one or more base stations 105, one or more UEs 115, and a broadcast transmitter 215. For example, the wireless communications system 200 may include base stations 105-*a*, and 105-*b*, and UE 115-*a*. The base stations 105 described in FIG. 2 may be examples of the base stations 105 described with reference to FIG. 1. In some examples, base stations 105-*a*, and 105-*b* may be referred to as a network device and/or gNB. UE 115-*a* may be an example of a UE 115 described with reference to FIG. 1. Base station 105-*a* may be an example of a serving base station 105 for UE 115-*a*, while base station 105-*b* may be an example of a neighboring base station 105.

The wireless communications system 200 may illustrate operations of and communications between the base stations 105 and the UEs 115 that support broadcast relay method in NR. Each base station 105 may provide a cell, where a base station 105 can provide service for a UE 115 within the coverage area of the cell. In the example of FIG. 2, the UE 115-a may move within the coverage area, and the cell may provide wireless communications to UE 115-a. In some instances, the base stations 105 may also be referred to as small cells. Additionally, UEs may receive one or more broadcast transmissions (such as broadcast signals) from the broadcast transmitter 215. In wireless communications system 200, a broadcast transmitter 215 may transmit broadcast signals to one or more UEs 115 and one or more base stations 105. In some examples, the broadcast transmitter 215 may be referred to as an NR broadcast transmitter. In some cases, the broadcast transmitter 215 may be a micro base station, where a small number of micro base stations cover a large area. In some examples, the broadcast transmitter 215 may transmit with high power. For example, the broadcast transmitter 215 may transmit with higher power than a macro cell.

In some implementations, the broadcast transmitter 215 may transmit an NR broadcast using low carrier frequency with relatively small bandwidth. In conventional wireless communications systems, an NR broadcast transmitter covers a large geographic area. In such cases, if a UE 115-a is located at a distance from the broadcast transmitter 215 (e.g., NR broadcast transmitter), the UE 115-a may be unable to successfully decode the broadcast signal. In one example, the broadcast signal may include one or more multi-resolution messages. For example, the broadcast signal may include multiple messages, each message being associated with a level of resolution. A higher level of resolution of a message may be associated with a higher signal-to-noise ratio at the UE 115-a. If a UE 115-a is located at a distance from the broadcast transmitter 215, the UE 115-a may determine that a signal-to-noise ratio of a broadcast signal is low. As a result, the UE 115-a may be able to decode a low-resolution message (such as, a low resolution broadcast content) among the one or more multi-resolution messages. In one example, a low-resolution message is one that may be received by a UE when the UE is far from the transmitter and the SNR is below a threshold SNR level. A low-resolution message may be the message having the lowest resolution among the multi-resolution messages. In another example, a low-resolution message may have a resolution below a threshold amount. In yet another example, a low-resolution message may have a resolution below a standard resolution for a receiving device. In some implementations, a UE 115 may receive a high signal-to-noise ratio by decoding multiple code layers (or multi-resolution message codewords mapped to layers) in the broadcast signal. However, if the signal-to-noise ratio is low (i.e., the location of the UE 115 is far from the location of the broadcast transmitter 215), then the UE can decode a basic layer of the broadcast signal (such as a message associated with a low signal-to-noise ratio threshold).

In existing wireless communications systems, there is no feedback mechanism for the broadcast transmitter 215. Thus, if the UE 115 is located far away from the broadcast transmitter 215, the UE 115 may be able to decode a basic layer associated with the broadcast signal (i.e., a layer including a low data content). A low data content may be any amount of data below a threshold level. Additionally, if the UE 115 is located closer to the broadcast transmitter 215, the UE 115 may be able to decode a second layer associated with the broadcast signal (such as multiple messages included in the broadcast signal). In some cases, the second layer associated with the broadcast signal may be an enhanced layer with a higher modulation and coding scheme. In some cases, the broadcast transmitter 215 may be unaware of the number and the location of the UEs within its coverage area 210-a. Additionally, the UE 115 may be unable to indicate an unsuccessful decoding to the broadcast transmitter 215. Thus, improved techniques for broadcasting may be desired. Some examples of the wireless communications system 200 may support improved broadcasting procedures in NR. In some cases, the UE 115 and the base station 105 may support a broadcast relay method.

According to one or more aspects of the present disclosure, the UE 115-a may utilize one or more base stations 105 to receive a relay of broadcast signal. In NR systems, base stations 105 (also referred to as NR small cells) may be deployed such that a UE 115-a is located close to one or more base stations 105. In some cases, the NR small cells (such as base stations 105) may be powerful in terms of number of antennas or performance. Additionally, because of smaller coverage area 210-b, the UE 115-a may be located at a more strategic position from the base station 105. In some cases, the UE 115-a may be away from line of sight of the broadcast transmitter 215. However, NR small cells may be located on top of building or on top of a light post, where there is a greater chance to be in line of sight and there is less fading. According to one aspect, one or more base stations 105 may be in a better signal-to noise condition to receive a broadcast signal from a broadcast transmitter 215 (such as NR broadcast transmitter). In some cases, the one or more base stations 105 may then relay the received broadcast signal to the UE 115-a. Relaying broadcast signal through the NR small cell (such as base stations 105) may allow the UE 115-a to receive high-resolution broadcast content.

According to one or more aspects of the present disclosure, the UE 115-a may receive a broadcast signal 205 from a broadcast transmitter 215. In some cases, the broadcast signal 205 may include one or more multi-resolution messages. In some implementations, the broadcast signal includes one or more systematic information bits and one or more redundancy coding bits. Upon receiving the broadcast signal 205, the UE 115-a may attempt to decode the broadcast signal. For example, the UE 115-a may decode at least one of the one or more multi-resolution messages based on receiving the broadcast signal 205 from the broadcast transmitter 215. In some cases, the UE 115-a determines that a data rate associated with the broadcast signal is less than a threshold based on decoding the at least one of the one or more multi-resolution messages. For example, the UE 115-a may determine that it is able to decode one of the multi-resolution messages included in the broadcast signal 205. In such cases, the UE 115-a may determine that the decoded message includes a low data content. In such cases, the UE 115-a may transmit a signal 230 querying a broadcast reception capability of a base station 105-a. In some implementation, the UE 115-a may determine that it is connected to a nearby small cell (i.e., base station 105-a), and the UE 115-a may query the base station 105-a to determine whether the base station 105-a has a capability to receive and relay a broadcast signal. The base station 105-a may receive the signal 230 querying the broadcast reception capability of the base station 105-a, and may determine whether the base station 105-a includes the capability to receive a broadcast transmission from the broadcast transmitter 215.

Different base stations may have different capabilities and conditions in terms of receiving the broadcast signal and relaying the broadcast signal to the UE 115-*a*. In some cases, the base station 105-*a* may indicate (via signal 230) that the base station 105-*a* includes a capability to receive the broadcast signal from the broadcast transmitter 215. Upon receiving the indication from the base station 105-*a*, the UE 115-*a* may determine a link quality between the base station 105-*a* and the UE 115-*a*. In some cases, the UE 115-*a* may select the base station 105-*a* for relaying the broadcast signal if the link quality exceeds a threshold value. Therefore, unlike conventional ways of selecting a base station (or a small cell) where the UE 115 selects the nearest base station, techniques described in the present disclosure provide for a selection criterion that considers both the broadcast link and the relay link associated with a base station. In some examples, instead of querying one base station (base station 105-*a* in this example), the UE 115-*a* may contact multiple base stations. In some cases, each of the multiple base stations may inform the UE 115-*a* a capability and a condition of receiving the broadcast signal. Upon receiving the capability information from each base station, the UE 115-*a* may select a base station for receiving a relay of a broadcast signal.

According to some aspects of the present disclosure, the base station 105-*a* may receive a broadcast signal 220 from the broadcast transmitter 215. In some cases, the base station 105-*a* may relay the broadcast signal to the UE 115-*a*. In some examples, the base station 105-*a* may broadcast the signal 230 indicating the broadcast reception capability using a first frequency, and received the broadcast signal 220 from the broadcast transmitter 215 using a second frequency. Additionally or alternatively, the base station 105-*a* may determine that the base station 105-*a* is incapable of receiving the broadcast signal from the broadcast transmitter 215. In some cases, the base station 105-*a* may transmit a signal indicating that the base station 105-*a* is incapable of receiving the broadcast signal from the broadcast transmitter 215. Upon receiving the indication of the broadcast reception capability of the base station 105-*a*, the UE 115-*a* may transmit a signal querying a broadcast reception capability of a second base station 105-*b*.

In some examples, the UE 115-*a* may receive an indication from the second base station 105-*b* indicating that the second base station 105-*b* includes a capability to receive the broadcast signal from the broadcast transmitter 215. In such cases, the UE 115-*a* may determine a first link quality between the UE 115-*a* and the base station 105-*a*, and a second link quality between the UE 115-*a* and the second base station 105-*b*. If the link quality between the UE 115-*a* and the second base station 105-*b* is greater than a threshold, then the UE 115-*a* may perform a handover procedure to connect to the second base station 105-*b* (such that the second base station 105-*b* can relay the broadcast signal received from the broadcast transmitter). Alternatively, if the link quality between the UE 115-*a* and the second base station 105-*b* is less than the threshold and if the link quality between the UE 115-*a* and the base station 105-*a* satisfies the threshold, then the UE 115-*a* may receive the broadcast signal using a multi-hope technique. That is, the second base station 105-*b* may receive the broadcast signal 235 from the broadcast transmitter 215, and relay the broadcast signal to the base station 105-*a*. The base station 105-*a* may then relay the broadcast signal to the UE 115-*a*.

In some examples, the base station 105-*a* may determine that the base station 105-*a* does not include the capability to receive a broadcast transmission from the broadcast transmitter 215. In such cases, the base station 105-*a* may transmit a signal 240 querying the broadcast reception capability of a second base station 105-*b*. The base station 105-*a* may receive an indication from the second base station 105-*b* indicating that the second base station 105-*b* includes a capability to receive the broadcast signal from the broadcast transmitter 215. In some implementations, the base station 105-*a* may then indicate the broadcast reception capability of the second base station 105-*b* to the UE 115-*a*.

In one or more examples, a broadcast channel (such as channel including the broadcast signal) may use a different frequency band than enhanced wireless broadband (such as the channel used for wireless communication between the base station 105 and the UE 115). Because broadcast channels are associated with higher penetration, broadcast signals are usually associated with a low carrier frequency. On the other hand, a link between the base station 105 and the UE 115-*a* may use mmW frequencies (such as 38 GHz). In some examples, the broadcast reception capability at the base station 105 may be based on at least one of a circuitry included in the base station, a broadcast reception quality at the base station, a current load at the base station, or a combination thereof. For example, one or more hardware (such as radio frequency chain) may restrict a base station 105 to include a capability to receive a broadcast signal from the broadcast transmitter. For example, a base station 105 may be located in a dense deployment, and may not support low carrier frequencies. Additionally or alternatively, a base station 105 may support low carrier frequencies, but a current broadcast reception quality may be less than a threshold. In such a case, the base station 105 may indicate that the base station 105 is incapable of receiving the broadcast signal from the broadcast transmitter 215.

According to one or more aspects, a UE 115-*a* may transmit, to a central entity, a signal querying the broadcast reception capability of the base station 105-*a*. In some cases, the UE 115-*a* may indicate a link quality between the base station 105-*a* and the UE 115-*a* to the central entity. In some examples, the central entity may know the capability and condition of receiving the broadcast signal of multiple base stations 105, and may make a selection decision for the UE 115-*a*. That is, the central entity may select a base station 105 suited for relaying the broadcast signal to the UE 115-*a*. In some cases, the central entity may indicate that the base station includes a capability to receive the broadcast signal from the broadcast transmitter.

According to one or more aspects of the present disclosure, the UE 115-*a* may receive a configuration signal indicating a transmission mode of a base station 105. For example, the UE 115-*a* may receive the configuration signal (such as a radio resource control signal) from the base station 105-*a*. In some cases, the UE 115-*a* may select the base station 105-*a* for receiving a relay of a broadcast signal, prior to receiving the configuration signal. In some cases, the UE 115-*a* may monitor at least a portion of a time slot for reception of a relay signal from the base station 105-*a* based on the transmission mode of the base station 105-*a*. In some cases, the relay signal is a relay of a broadcast signal transmitted from the broadcast transmitter 215. The base station 105-*a* may receive the broadcast signal from the broadcast transmitter 215, and may transmit the broadcast signal to the UE 115-*a* according to a transmission mode of the base station 105-*a*. For example, the base station 105-*a* may indicate a start time of a transmission mode to the UE 115-*a*. In some cases, the start time of the transmission mode coincides with a start time of the reception mode at the UE 115-*a*.

In some implementations, the start time of the transmission mode of the base station 105-a may be indicated to the UE 115-a, based on the condition of receiving the broadcast signal. In such a case, the UE may determine the start time for receiving a relay signal (i.e., relay of the broadcast signal) in every frame. Alternatively, the timing of transmission of the relay signal can be flexible where the UE 115-a monitors multiple predefined instances for reception of the relay signal from the base station 105-a. In some implementations, the UE 115-a may identify a start time for reception of the relay signal from the base station 105-a based on the transmission mode of the base station 105-a. The UE 115-a may then initiate the monitoring of the time slot at the identified start time for reception of the relay signal from the base station 105-a. In certain instances, the UE 115-a may receive a physical downlink control channel based on the transmission mode of the base station. The UE 115-a may initiate monitoring at least the portion of the time slot for reception of the relay signal from the base station 105-a based on receiving the physical downlink control channel. In some cases, the UE 115-a also monitors certain time instances for reception of the physical downlink control channel. The time instances may be based on at least one of the transmission mode of the base station, the configuration signal, or a combination thereof. In some cases, the UE 115-a may monitor for the physical downlink control channel while the base station 105-a is in a reception mode (i.e., while the base station 105-a is receiving the broadcast transmission form the broadcast transmitter 215).

In some examples, the UE 115-a may monitor for one or more broadcast transmissions from the broadcast transmitter 215 while monitoring for the relay signal (or relay or the broadcast signal) from the base station 105-a. Alternatively, the UE 115-a may switch off the receive chain associated with low carrier frequency (such as receive chain intended for receiving the broadcast signal from the broadcast transmitter 215) while monitoring for the relay signal. In some cases, a timing boundary associated with a reception of the relay signal may be equal to a timing boundary associated with a reception of the broadcast signal. That is, both the reception of the relay signal and the reception of the broadcast signal may be completed prior to completion of a frame (e.g., 10 ms). In some examples, a modulation and coding scheme associated with the relay signal (i.e., relay of the broadcast signal) may be greater than the modulation and coding scheme associated with the broadcast signal. In some cases, the relay signal includes an in-band signal, or an out-of-band signal, or both. Additionally or alternatively, the relay signal may be transmitted using mmW frequencies and the broadcast signal may be transmitted using sub-6 frequencies (for example, a frequency range below 6 GHz, in the range of 1-6 GHz).

Thus, the present disclosure provides for a relay method for broadcast signals, where a UE, while receiving a broadcast signal from the broadcast transmitter, seeks to be connected to a nearby base station and checks whether the base station includes the capability to relay the broadcast signal.

Figure 3:
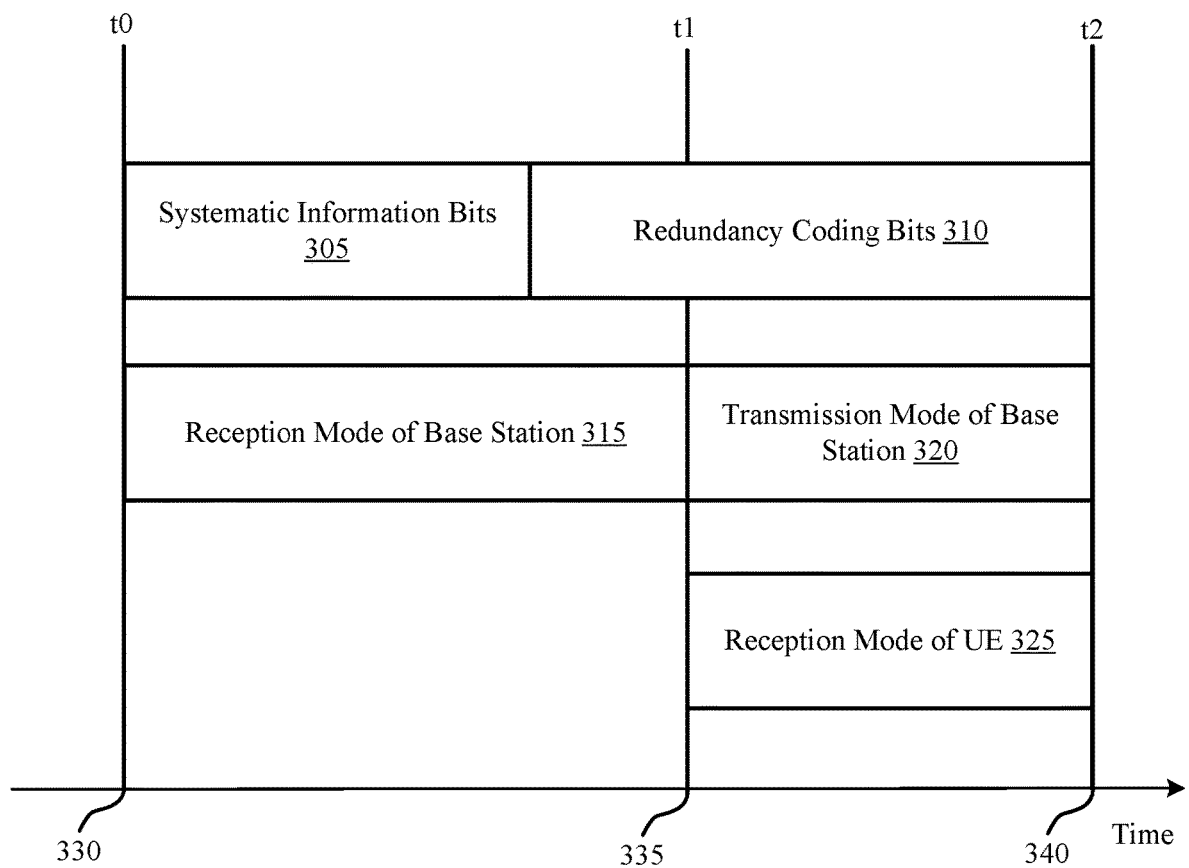
FIG. 3 illustrates an example of a timing diagram that supports broadcast relay method in NR in accordance with one or more aspects of the present disclosure.

FIG. 3 illustrates an example of a timing diagram 300 that supports broadcast relay method in NR in accordance with one or more aspects of the present disclosure. In some examples, timing diagram 300 may implement aspects of wireless communications system 100 and wireless communications system 200. According to one or more aspects of the present disclosure, a UE 115 may determine that a data rate associated with a broadcast signal is less than a threshold level. Upon determining the data rate, the UE 115 may utilize one or more base stations 105 to receive a relay of broadcast signal. In one example, a UE 115 may connect to a base station 105 (or small cell) and may check whether the base station 105 includes the capability to relay the broadcast signal. In some cases, the UE 115 may receive an indication of a broadcast reception capability of the base station 105. For example, the base station 105 may indicate that it has a capability to receive a broadcast signal from a broadcast transmitter. In some cases, the UE 115 may select the base station 105 for receiving a relay of the broadcast signal (or a relay signal) if a link quality between the base station 105 and the UE 115 satisfies a threshold. Upon selecting the base station 105, the UE 115 may receive a configuration signal from the base station 105. In some examples, the configuration signal may include a transmission mode for the base station 105.

As described in FIG. 3, the base station 105 may receive the broadcast signal from a broadcast transmitter. The broadcast signal may include systematic information bits 305 and redundancy coding bits 310. In some examples, the base station 105 may receive the broadcast signal at time t0 330. The base station 105 may begin receiving the broadcast signal during a reception mode 315 of the base station. The reception mode 315 of the base station may also begin at time t0 330. Upon receiving the broadcast signal, the base station 105 decodes the broadcast signal and re-encodes the broadcast signal. The base station 105 may then transmit the re-encoded broadcast signal to the UE 115. In some cases, the base station 105 may transmit the re-encoded broadcast signal during a transmission mode 320 of the base station 105. In some cases, the base station 105 may transmit the relay signal to the UE 115 in an unicast manner. In this example, a start time for the transmission mode 320 of the base station 105 is at time t1 335. The UE 115 may receive the relay signal from the base station 105 during a reception mode 325 of the UE. In one example, the reception mode 325 of the UE is aligned with the transmission mode 320 of the base station 105. In some cases, the start time of the transmission mode of the base station 105 (time t1 335) may be indicated to the UE 115, using a configuration signal. In some cases, the transmission of the relay signal is completed no later than the end of the frame (i.e., time t2 340) of the original broadcast signal. Completing the reception of the relay signal within the end of the frame ensures that the relay operation does not add any delay.

In some implementations, the start time of the transmission mode 320 of the base station 105 may be indicated to the UE 115, and the UE may determine the start time for receiving a relay signal (i.e., relay of the broadcast signal) in every frame based on the transmission mode 320 of the base station 105. Alternatively, the timing of transmission of the relay signal can be flexible where the UE 115 monitors multiple time instances for reception of the relay signal from the base station 105.

Figure 4:
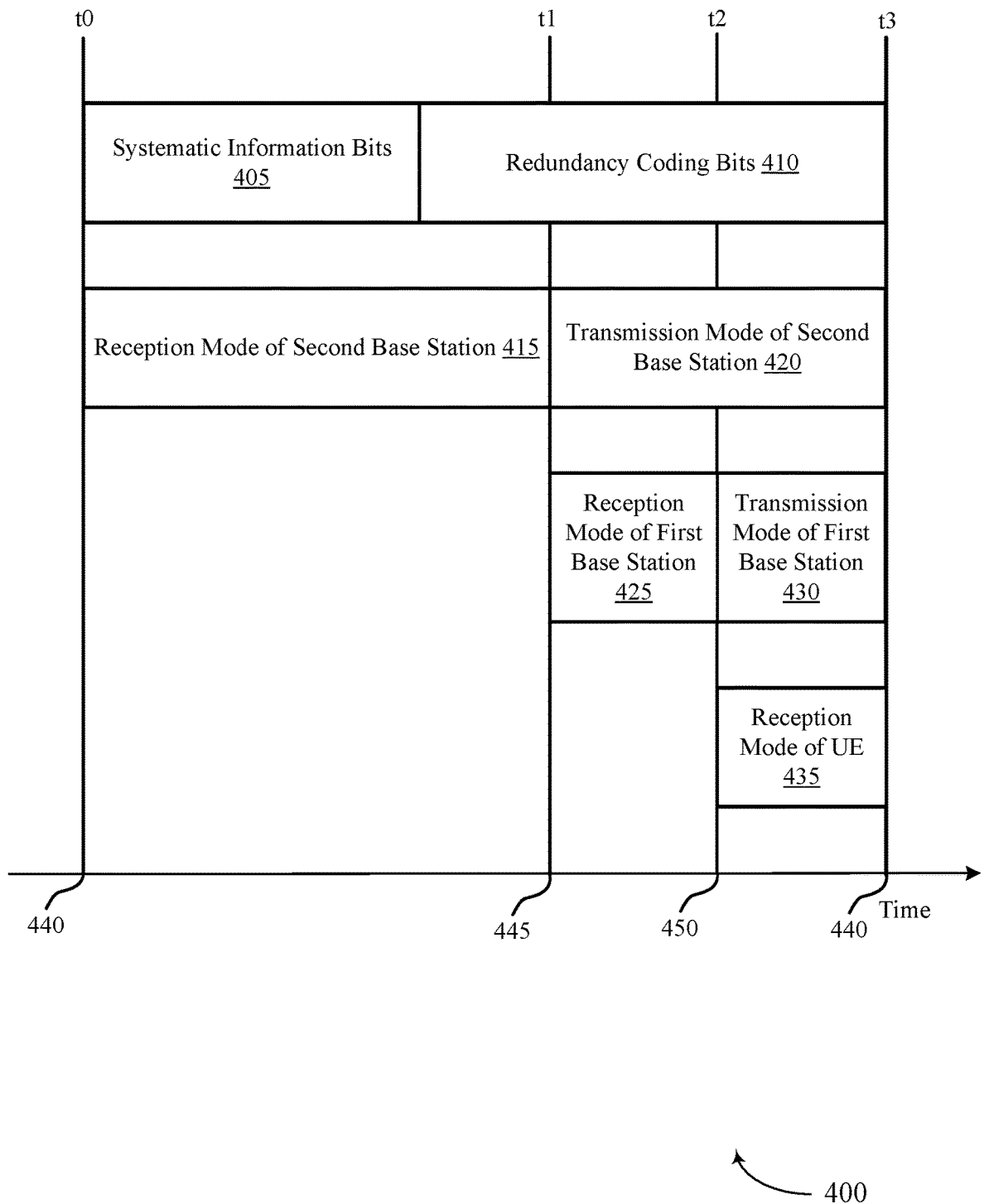
FIG. 4 illustrates an example of a timing diagram that supports broadcast relay method in NR in accordance with one or more aspects of the present disclosure.

FIG. 4 illustrates an example of a timing diagram 400 that supports broadcast relay method in NR in accordance with one or more aspects of the present disclosure. In some examples, timing diagram 400 may implement aspects of wireless communications system 100 and wireless communications system 200. According to one or more aspects of the present disclosure, a UE 115 may utilize one or more base stations 105 to receive a relay of broadcast signal. In order to receive a relay of a broadcast signal, a UE 115 may connect to a first base station 105 (or small cell) and may check whether the first base station 105 includes the capability to relay the broadcast signal. In some cases, the UE 115 may receive an indication of a broadcast reception capability of the first base station 105. In some examples, the first base station 105 may indicate that it is incapable of receiving a broadcast signal from a broadcast transmitter. In some cases, the UE 115 may transmit a query to a second base station 105. For example, the UE 115 may query the broadcast reception capability of the second base station 105. In some cases, the UE 115 may determine that the second base station has a capability to receive the broadcast signal from the broadcast transmitter. However, the link quality between the second base station 105 and the UE 115 may be less than a threshold. Additionally, the link quality between the first base station 105 and the UE 115 may satisfy the threshold. In such a case, the UE 115 may receive a relay of the broadcast signal using multi-hop techniques. Specifically, the second base station 105 may receive the broadcast signal from the broadcast transmitter, and relay the broadcast signal to the first base station 105. The first base station 105 may then relay the broadcast signal to the UE 115. In some implementations, the UE 115 may receive a configuration signal from first base station 105. In some examples, the configuration signal may include a transmission mode for the first base station 105.

In the example of FIG. 4, the second base station 105 may receive the broadcast signal from a broadcast transmitter. The broadcast signal may include systematic information bits 405 and redundancy coding bits 410. In some examples, the second base station 105 may begin receiving the broadcast signal at time t0 440. The second base station 105 may receive the broadcast signal during a reception mode 415 of the second base station, where reception mode 415 of the second base station may begin at time t0 440. In some cases, the second base station 105 decodes the broadcast signal and re-encodes the broadcast signal within the reception mode 415 of the second base station. The second base station 105 may then transmit the re-encoded broadcast signal to the first base station 105. In some cases, the second base station 105 may transmit the re-encoded broadcast signal during a transmission mode 420 of the second base station 105. In the example of FIG. 4, a start time for the transmission mode 420 of the second base station 105 is at time t1 445. In some examples, the first base station 105 may receive the relay signal from the second base station 105 during a reception mode 425 of the first base station 105. The first base station 105 may then transmit the relay signal during a transmission mode 430 of the first base station 105. In this example, a start time for the transmission mode 430 of the first base station 105 is at time t2 450. The UE 115 may receive the relay signal from the first base station 105 during a reception mode 435 of the UE. As depicted in the example of FIG. 4, reception mode 435 of the UE, the transmission mode 430 of the first base station 105, and the transmission mode 420 of the second base station 105 may be completed no later than the end of the frame (i.e., time t3 440) of the original broadcast signal.

Figure 5:
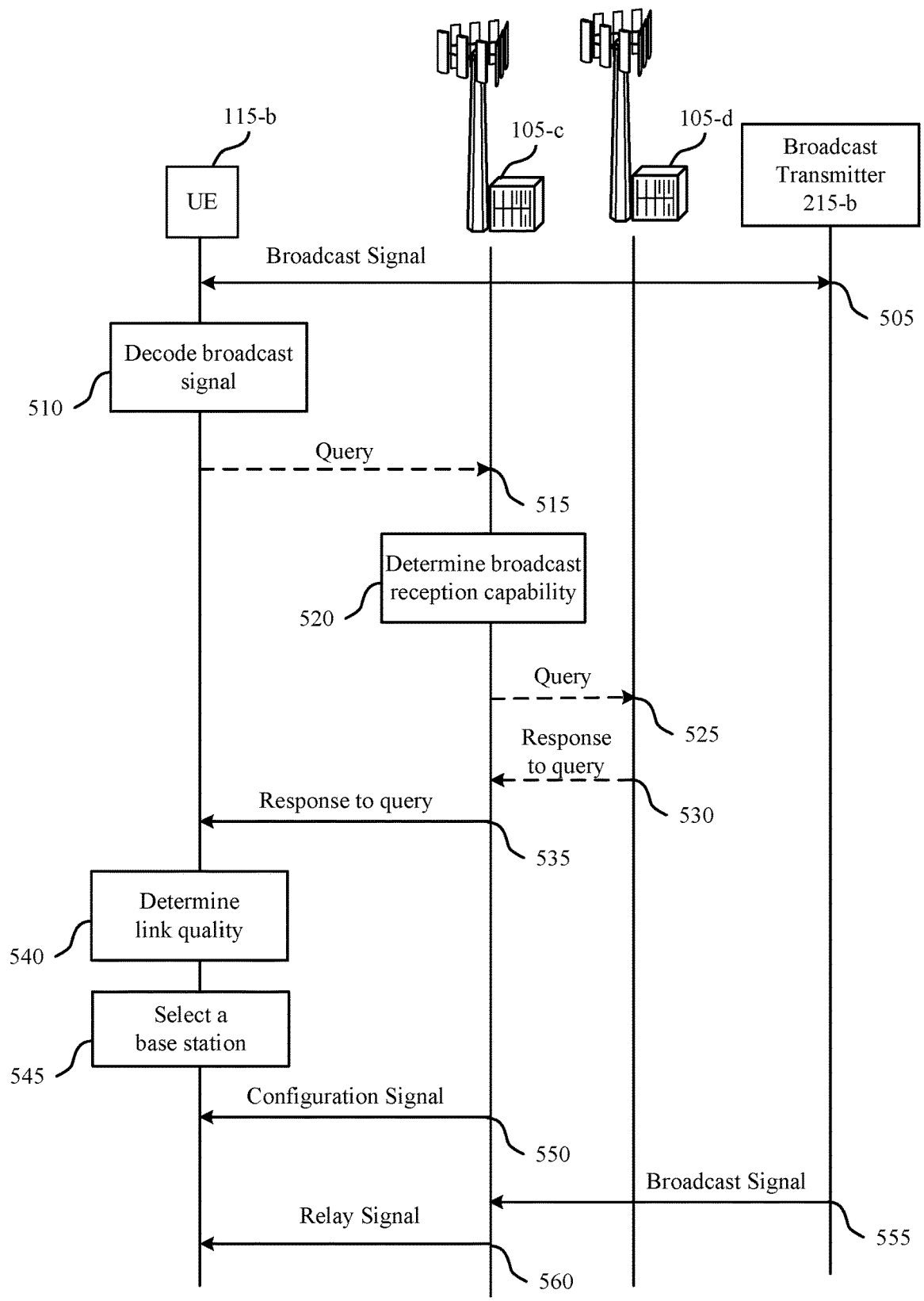
FIG. 5 illustrates an example of a process flow that supports broadcast relay method in NR in accordance with one or more aspects of the present disclosure.

FIG. 5 illustrates an example of a process flow 500 that supports broadcast relay method in NR in accordance with one or more aspects of the present disclosure. In some examples, process flow 500 may implement aspects of wireless communications system 100 and wireless communications system 200. The process flow 500 may include base station 105-c, base station 105-d, UE 115-b, and broadcast transmitter 215-b, which may be examples of the corresponding devices described with reference to FIGS. 1 through 4. Base station 105-c, base station 105-d, UE 115-b, and broadcast transmitter 215-b may support broadcast relay method in NR to achieve resource savings.

In the following description of the process flow 500, the operations between UE 115-b and base stations 105-c and 105-d may be transmitted in a different order than the exemplary order shown. The operations performed by UE 115-b or base stations 105-c and 105-d may be performed in different orders or at different times than the exemplary order shown. Certain operations may also be left out of the process flow 500, or other operations may be added to the process flow 500. Further, base station 105-c, base station 105-d, UE 115-b, and broadcast transmitter 215-b are merely examples, and the described features may be associated with any number of devices.

At 505, the UE 115-b may receive a broadcast signal from the broadcast transmitter 215-b. In some cases, the broadcast signal may include one or more multi-resolution messages. At 510, the UE 115-b may decode at least one of the one or more multi-resolution messages based on receiving the broadcast signal from the broadcast transmitter 215-b. In one example, the UE 115-b may determine that a data rate associated with the broadcast signal is less than a threshold based on decoding the at least one of the one or more multi-resolution messages.

At 515, the UE 115-b may transmit a signal querying the broadcast reception capability of the base station 105-c. In some cases, the UE 115-b may transmit the signal in response to receiving the broadcast signal from the broadcast transmitter. In some cases, the UE 115-b may transmit the signal based on determining that the data rate associated with the broadcast signal is less than the threshold.

At 520, the base station 105-c may determine a broadcast reception capability. For example, the base station 105-c may determine whether the base station 105-c includes a capability to receive a broadcast signal from the broadcast transmitter 215-b. In some cases, the base station 105-c may determine that the base station 105-c is incapable of receiving the broadcast signal from the broadcast transmitter 215-b.

If the base station 105-c is incapable of receiving the broadcast signal from the broadcast transmitter 215-b, at 525, the base station 105-c may optionally transmit, to a second base station 105-d, a second signal querying the broadcast reception capability of the second base station 105-d. The second base station 105-d may determine the broadcast reception capability and at 530, the second base station 105-d may optionally indicate the broadcast reception capability to the base station 105-c.

At 535, the UE 115-b may receive a signal indicating a broadcast reception capability of the base station 105-c. In cases where the base station 105-c determines that the base station 105-c is incapable of receiving the broadcast signal, the base station 105-c may indicate the broadcast reception capability of the second base station 105-d.

At 540, the UE 115-b may determine a link quality between the base station 105-c and the UE 115-b based on receiving the signal at 535. At 545, the UE 115-b may select the base station 105-c for reception of the broadcast signal based on the determined link quality.

At 550, the base station 105-c may transmit a configuration signal to the UE 115-b. In some cases, the configuration signal may indicate a transmission mode of the base station 105-c. The UE 115-b may monitor at least a portion of a time slot for reception of a relay signal from the base station 105-c based on the transmission mode of the base station 105-c. In some examples, the relay signal includes a relay of a broadcast signal transmitted from the broadcast transmitter 215-b.

At 555, the base station 105-*c* receives a broadcast signal from the broadcast transmitter 215-*b*. In some cases, the broadcast signal may include one or more systematic information bits and one or more redundancy coding bits. At 560, the UE 115-*b* may receive the relay signal from the base station 105-*c*. In some cases, the UE 115-*b* may receive the relay signal monitoring the portion of the time slot.

Figure 6:
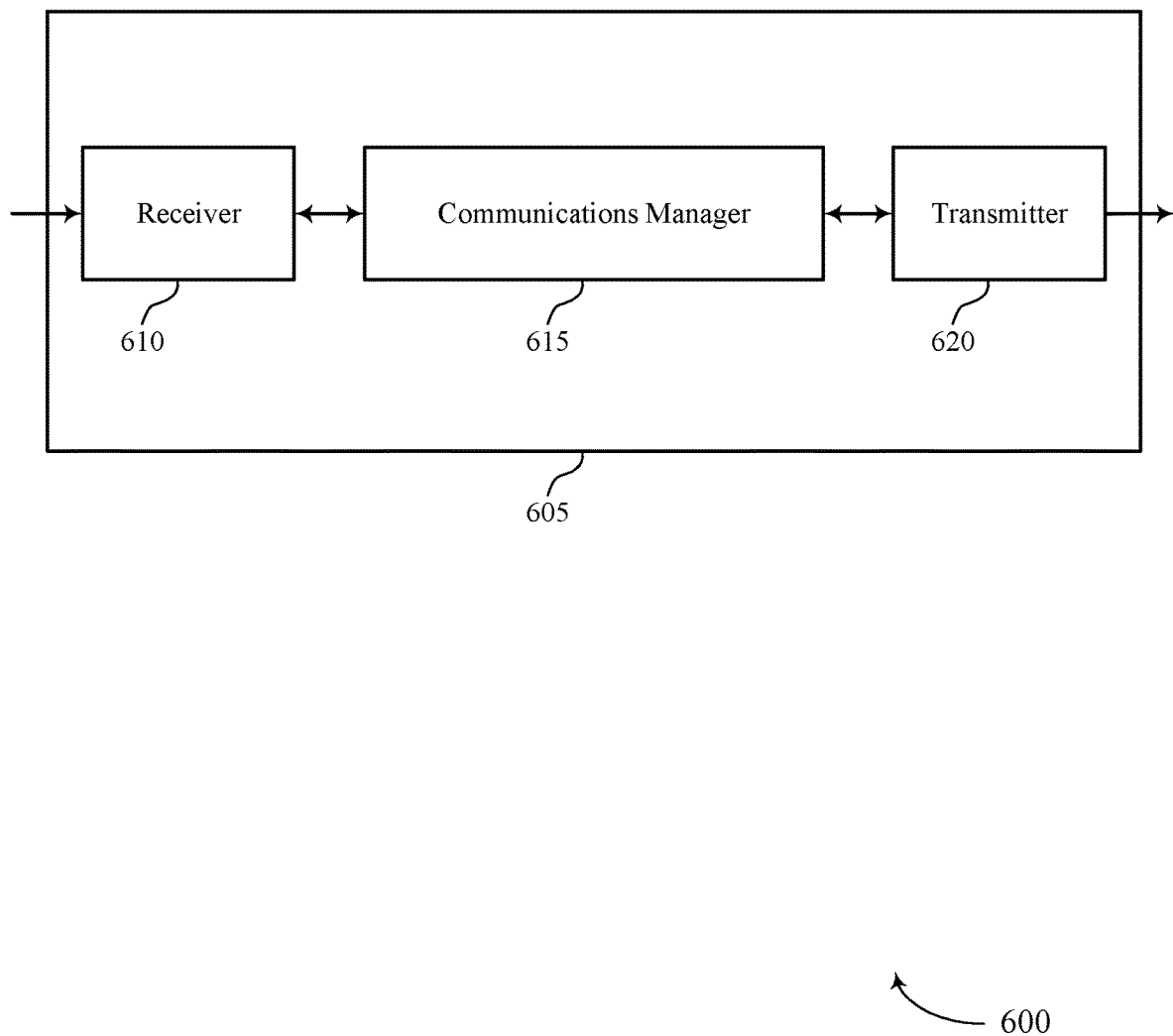
FIGS. 6 and 7 show block diagrams of devices that support broadcast relay method in NR in accordance with one or more aspects of the present disclosure.

FIG. 6 shows a block diagram 600 of a device 605 that supports broadcast relay method in NR in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to broadcast relay method in NR, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a broadcast transmitter, a broadcast signal including one or more multi-resolution messages, receive a signal indicating a broadcast reception capability of the base station, and communicate, with the base station, based on the broadcast reception capability of the base station. According to one or more aspects, the communications manager 615 may receive, from a base station, a configuration signal indicating a transmission mode of the base station, monitor at least a portion of a time slot for reception of a relay signal from the base station based on the transmission mode of the base station, where the relay signal includes a relay of a broadcast signal transmitted from a broadcast transmitter, and receive, from the base station, the relay signal based on monitoring the portion of the time slot. Additionally or alternatively, the communications manager 615 may receive, from a broadcast transmitter, a broadcast signal including one or more multi-resolution messages, transmit a first signal querying a broadcast reception capability of a base station in response to receiving the broadcast signal from the broadcast transmitter, receive a second signal indicating the broadcast reception capability of the base station, receive, from the base station, a configuration signal indicating a transmission mode of the base station, monitor at least a portion of a time slot for reception of a relay signal from the base station based on the transmission mode of the base station, where the relay signal includes a relay of the broadcast signal transmitted from the broadcast transmitter to the base station, and receive, from the base station, the relay signal based on the monitored portion of the time slot. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with one or more aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
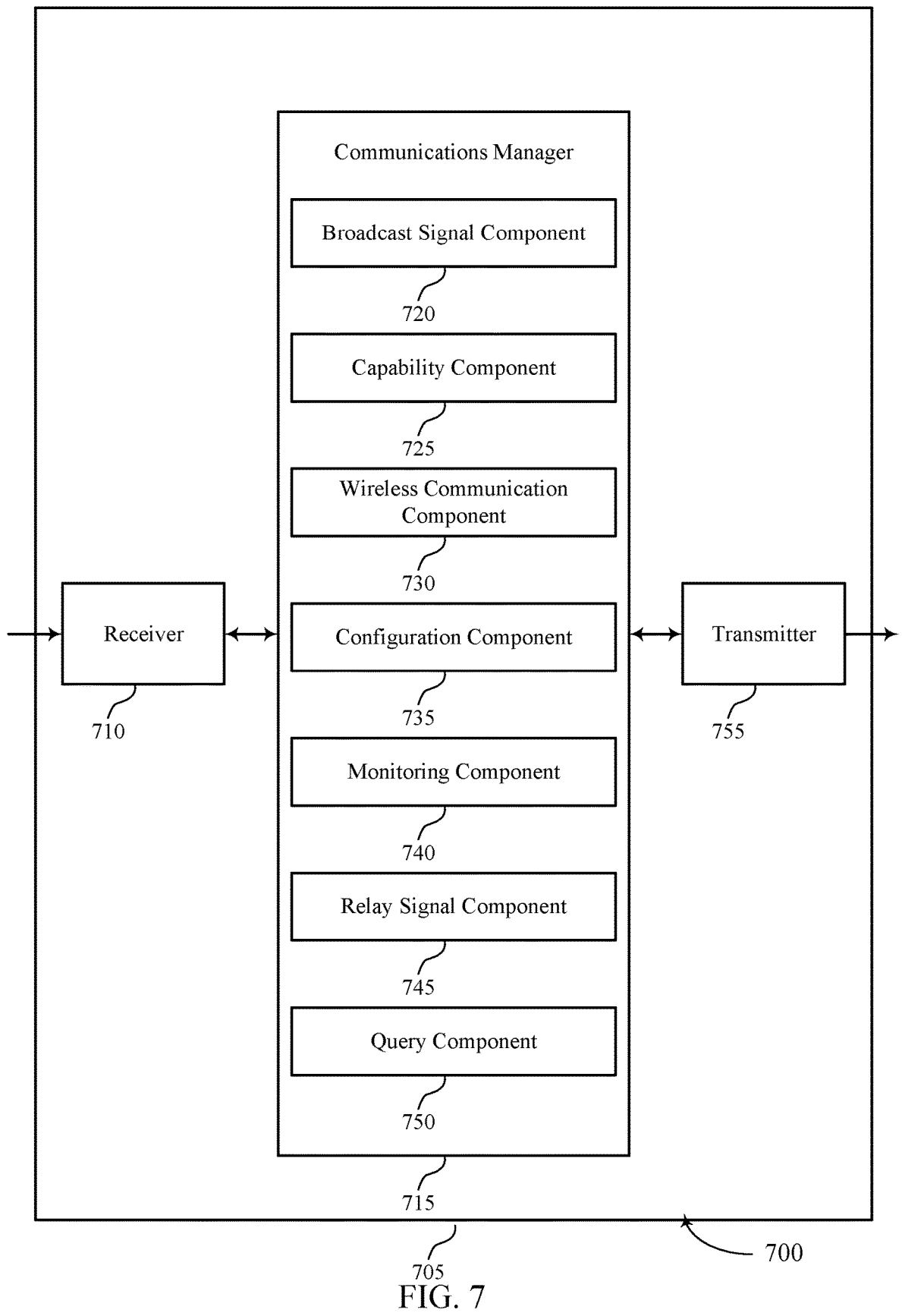

FIG. 7 shows a block diagram 700 of a device 705 that supports broadcast relay method in NR in accordance with one or more aspects of the present disclosure. The device 705 may be an example of aspects of a device 605, or a UE 115 as described herein. The device 705 may include a receiver 710, a communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to broadcast relay method in NR, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a broadcast signal component 720, a capability component 725, a wireless communication component 730, a configuration component 735, a monitoring component 740, a relay signal component 745, and a query component 750. The communications manager 715 may be an example of aspects of the communications manager 910 described herein.

The broadcast signal component 720 may receive, from a broadcast transmitter, a broadcast signal including one or more multi-resolution messages. The capability component 725 may receive a signal indicating a broadcast reception capability of the base station. The wireless communication component 730 may communicate, with the base station, based on the broadcast reception capability of the base station.

The configuration component 735 may receive, from a base station, a configuration signal indicating a transmission mode of the base station. The monitoring component 740 may monitor at least a portion of a time slot for reception of a relay signal from the base station based on the transmission mode of the base station, where the relay signal includes a relay of a broadcast signal transmitted from a broadcast transmitter. The relay signal component 745 may receive, from the base station, the relay signal based on monitoring the portion of the time slot.

The broadcast signal component 720 may receive, from a broadcast transmitter, a broadcast signal including one or more multi-resolution messages. The query component 750 may transmit a first signal querying a broadcast reception capability of a base station in response to receiving the broadcast signal from the broadcast transmitter. The capability component 725 may receive a second signal indicating the broadcast reception capability of the base station. The configuration component 735 may receive, from the base station, a configuration signal indicating a transmission mode of the base station. The monitoring component 740 may monitor at least a portion of a time slot for reception of a relay signal from the base station based on the transmission mode of the base station, where the relay signal includes a relay of the broadcast signal transmitted from the broadcast transmitter to the base station. The relay signal component 745 may receive, from the base station, the relay signal based on the monitored portion of the time slot.

The transmitter 755 may transmit signals generated by other components of the device 705. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

Figure 8:
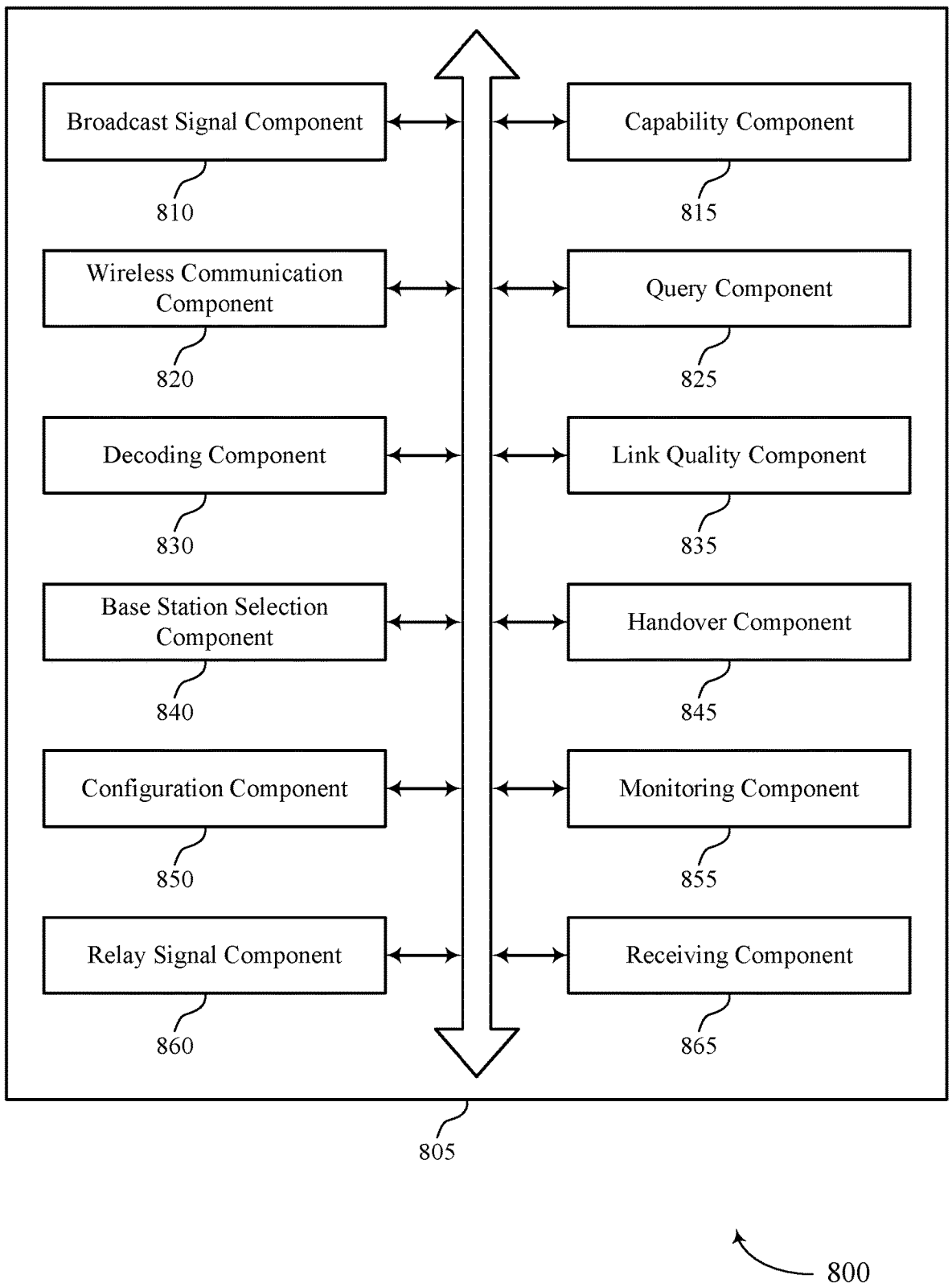
FIG. 8 shows a block diagram of a communications manager that supports broadcast relay method in NR in accordance with one or more aspects of the present disclosure.

FIG. 8 shows a block diagram 800 of a communications manager 805 that supports broadcast relay method in NR in accordance with one or more aspects of the present disclosure. The communications manager 805 may be an example of aspects of a communications manager 615, a communications manager 715, or a communications manager 910 described herein. The communications manager 805 may include a broadcast signal component 810, a capability component 815, a wireless communication component 820, a query component 825, a decoding component 830, a link quality component 835, a base station selection component 840, a handover component 845, a configuration component 850, a monitoring component 855, a relay signal component 860, and a receiving component 865. Each of these modules may communicate, directly or indirectly, with one another (e.g., via one or more buses).

The broadcast signal component 810 may receive, from a broadcast transmitter, a broadcast signal including one or more multi-resolution messages. In some cases, the broadcast transmitter includes an NR broadcast transmitter and the base station includes an NR small cell. In some cases, a distance between the broadcast transmitter and the UE is greater than a distance between the base station and the UE. The capability component 815 may receive a signal indicating a broadcast reception capability of the base station. The wireless communication component 820 may communicate, with the base station, based on the broadcast reception capability of the base station.

The query component 825 may transmit a second signal querying the broadcast reception capability of a base station in response to receiving the broadcast signal from the broadcast transmitter. The decoding component 830 may decode at least one of the one or more multi-resolution messages based on receiving the broadcast signal from the broadcast transmitter. In some examples, the decoding component 830 may determine that a data rate associated with the broadcast signal is less than a threshold based on decoding the at least one of the one or more multi-resolution messages, where transmitting the second signal is based on the determining.

In some examples, receiving, from the base station, the signal indicating that the base station includes a capability to receive the broadcast signal from the broadcast transmitter. The link quality component 835 may determine a link quality between the base station and the UE based on receiving the signal. The base station selection component 840 may select the base station for reception of the broadcast signal based on the determined link quality, where communicating with the base station is based on the selecting.

In some examples, the capability component 815 may receive, from the base station, the second signal indicating that the base station is incapable of receiving the broadcast signal from the broadcast transmitter. In some examples, the query component 825 may transmit, to a second base station, a second signal querying the broadcast reception capability of the second base station. In some examples, the capability component 815 may receive, from the second base station, a third signal indicating that the second base station includes a capability to receive the broadcast signal from the broadcast transmitter.

In some examples, the link quality component 835 may determine a first link quality between the base station and the UE based on receiving the signal. In some examples, the link quality component 835 may determine a second link quality between the second base station and the UE based on receiving the third signal. In some examples, the base station selection component 840 may select the base station for reception of the broadcast signal based on the first link quality and the second link quality, where the second base station relays the broadcast signal to the base station. In some cases, the first link quality is greater than the second link quality.

In some examples, the link quality component 835 may determine a link quality between the second base station and the UE based on receiving the third signal. The handover component 845 may perform a handover procedure to establish a connection with the second base station based on the link quality satisfying a threshold. In some cases, the signal and the second signal are the same signal. In some cases, the signal and the second signal are different signals.

In some examples, query component 825 may transmit, to a central entity, a second signal querying the broadcast reception capability of the base station, where the second signal includes an indication of a link quality between the base station and the UE. In some examples, the capability component 815 may receive, from the central entity, the signal indicating that the base station includes a capability to receive the broadcast signal from the broadcast transmitter. In some cases, the broadcast reception capability at the base station is based on at least one of a circuitry included in the base station, a broadcast reception quality at the base station, a current load at the base station, or a combination thereof.

The configuration component 850 may receive, from a base station, a configuration signal indicating a transmission mode of the base station. The monitoring component 855 may monitor at least a portion of a time slot for reception of a relay signal from the base station based on the transmission mode of the base station, where the relay signal includes a relay of a broadcast signal transmitted from a broadcast transmitter. The relay signal component 860 may receive, from the base station, the relay signal based on monitoring the portion of the time slot.

In some examples, the relay signal component 860 may identify a start time for reception of the relay signal from the base station based on the transmission mode of the base station. In some examples, the monitoring component 855 may initiate the monitoring of the time slot at the identified start time for reception of the relay signal from the base station. The receiving component 865 may receive, from the base station, a physical downlink control channel based on the transmission mode of the base station. In some examples, the monitoring component 855 may initiate monitoring at least the portion of the time slot for reception of the relay signal from the base station based on receiving the physical downlink control channel.

In some examples, the monitoring component 855 may monitor one or more time instances for reception of the physical downlink control channel based on the transmission mode of the base station, where receiving the physical downlink control channel is further based on monitoring the one or more time instances. In some cases, the one or more time instances are identified based on at least one of the transmission mode of the base station, the configuration signal, or a combination thereof.

In some examples, the broadcast signal component 810 may receive, from a broadcast transmitter, a broadcast signal including one or more multi-resolution messages. In some examples, the decoding component 830 may decode at least one of the one or more multi-resolution messages based on receiving the broadcast signal from the broadcast transmitter. In some examples, the base station selection component 840 may select the base station for reception of the broadcast signal based on decoding the at least one of the one or more multi-resolution messages and a broadcast reception capability at the base station, where receiving the relay signal from the base station is based on selecting the base station. In some cases, the broadcast reception capability at the base station is based on at least one of a circuitry included in the base station, a broadcast reception quality at the base station, a current load at the base station, or a combination thereof.

In some examples, the monitoring component 855 may monitor for one or more broadcast transmissions from the broadcast transmitter. In some examples, the relay signal component 860 may receive, from the base station, a beamformed transmission including the relay signal. In some cases, a timing boundary associated with a reception of the relay signal is equal to a timing boundary associated with a reception of the broadcast signal. In some cases, the relay signal includes an in-band signal, or an out-of-band signal, or both. In some cases, the relay signal is transmitted using millimeter wave frequencies and the broadcast signal is transmitted using sub-6 frequencies.

In some examples, the broadcast signal component 810 may receive, from the broadcast transmitter, the broadcast signal including one or more multi-resolution messages. In some examples, the query component 825 may transmit a first signal querying a broadcast reception capability of a base station in response to receiving the broadcast signal from the broadcast transmitter. In some examples, the capability component 815 may receive a second signal indicating the broadcast reception capability of the base station. In some examples, the configuration component 850 may receive, from the base station, a configuration signal indicating a transmission mode of the base station. In some examples, the monitoring component 855 may monitor at least a portion of a time slot for reception of a relay signal from the base station based on the transmission mode of the base station, where the relay signal includes a relay of the broadcast signal transmitted from the broadcast transmitter to the base station. In some examples, the relay signal component 860 may receive, from the base station, the relay signal based on the monitored portion of the time slot.

In some examples, the decoding component 830 may decode at least one of the one or more multi-resolution messages based on receiving the broadcast signal from the broadcast transmitter. In some examples, the decoding component 830 may determine that a data rate associated with the broadcast signal is less than a threshold based on decoding the at least one of the one or more multi-resolution messages, where transmitting the first signal is based on the determining.

In some examples, the capability component 815 may receive, from the base station, the second signal indicating that the base station includes a capability to receive the broadcast signal from the broadcast transmitter. In some examples, the relay signal component 860 may identify a start time for reception of the relay signal from the base station based on the transmission mode of the base station. In some examples, the monitoring component 855 may initiate the monitoring of the time slot at the identified start time for reception of the relay signal from the base station.

In some examples, the monitoring component 855 may monitor one or more time instances for reception of a physical downlink control channel based on the transmission mode of the base station. In some examples, the receiving component 865 may receive, from the base station, the physical downlink control channel based on monitoring the one or more time instances. In some examples, the monitoring component 855 may initiate monitoring at least the portion of the time slot for reception of the relay signal from the base station based on receiving the physical downlink control channel.

In some examples, the capability component 815 may receive from the base station, the second signal indicating that the base station is incapable of receiving the broadcast signal from the broadcast transmitter. In some examples, the query component 825 may transmit, to a second base station, a third signal querying the broadcast reception capability of the second base station. In some examples, the capability component 815 may receive, from the second base station, a fourth signal indicating that the second base station includes a capability to receive the broadcast signal from the broadcast transmitter.

In some examples, the link quality component 835 may determine a first link quality between the base station and the UE based on receiving the second signal. In some examples, the link quality component 835 may determine a second link quality between the second base station and the UE based on receiving the fourth signal. In some examples, the base station selection component 840 may select the base station for reception of the broadcast signal based on the first link quality and the second link quality, where the second base station relays the broadcast signal to the base station. In some cases, the broadcast reception capability at the base station is based on at least one of a circuitry included in the base station, a broadcast reception quality at the base station, a current load at the base station, or a combination thereof. In some cases, the broadcast transmitter includes an NR broadcast transmitter and the base station includes an NR small cell. In some cases, the broadcast transmitter includes an NR broadcast transmitter and the base station includes an NR small cell.

Figure 9:
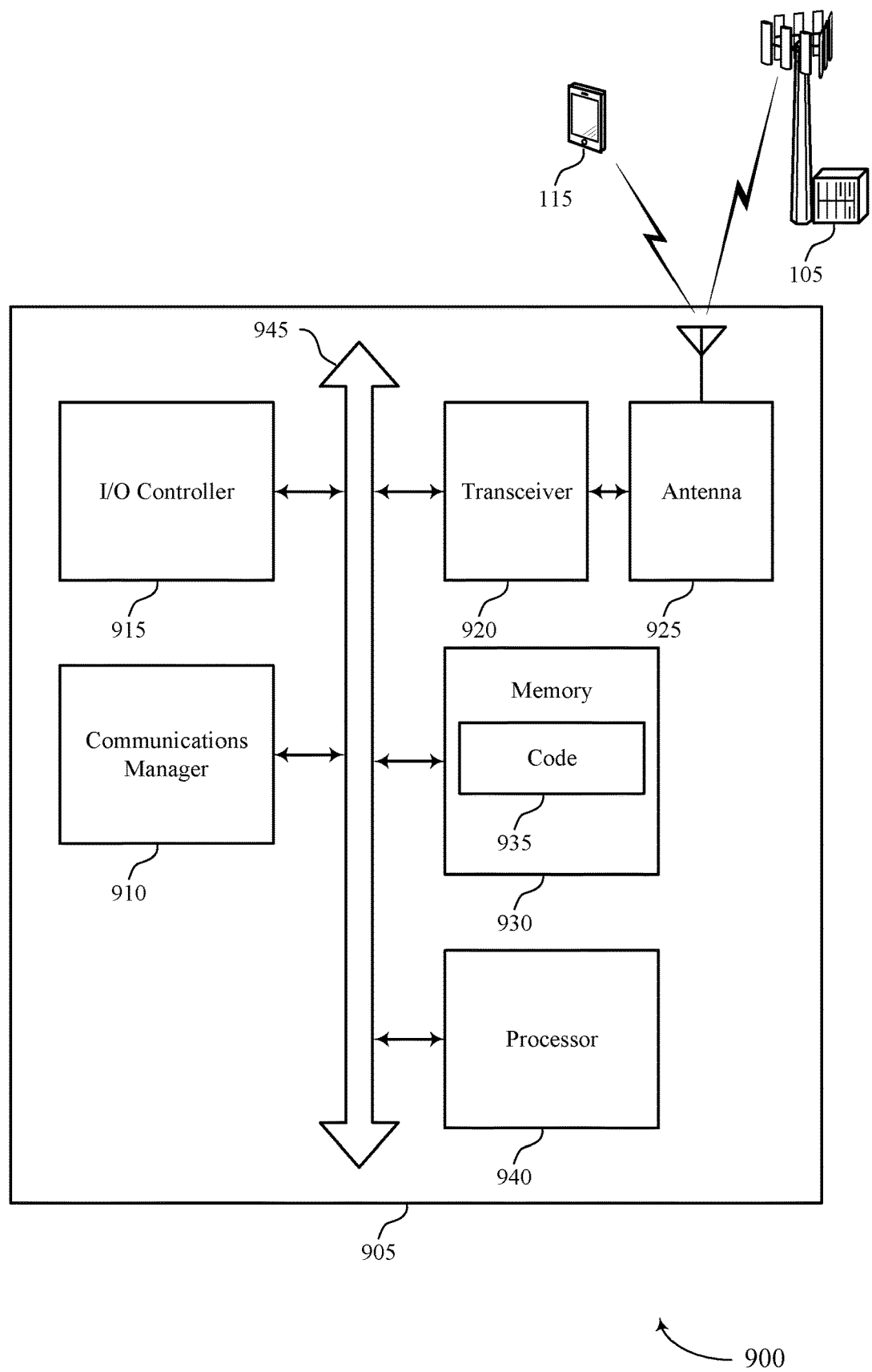
FIG. 9 shows a diagram of a system including a device that supports broadcast relay method in NR in accordance with one or more aspects of the present disclosure.

FIG. 9 shows a diagram of a system 900 including a device 905 that supports broadcast relay method in NR in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a broadcast transmitter, a broadcast signal including one or more multi-resolution messages, receive a signal indicating a broadcast reception capability of the base station, and communicate, with the base station, based on the broadcast reception capability of the base station. Additionally or alternatively, the communications manager 910 may receive, from a base station, a configuration signal indicating a transmission mode of the base station, monitor at least a portion of a time slot for reception of a relay signal from the base station based on the transmission mode of the base station, where the relay signal includes a relay of a broadcast signal transmitted from a broadcast transmitter, and receive, from the base station, the relay signal based on monitoring the portion of the time slot. Additionally or alternatively, the communications manager 910 may receive, from a broadcast transmitter, a broadcast signal including one or more multi-resolution messages, transmit a first signal querying a broadcast reception capability of a base station in response to receiving the broadcast signal from the broadcast transmitter, receive a second signal indicating the broadcast reception capability of the base station, receive, from the base station, a configuration signal indicating a transmission mode of the base station, monitor at least a portion of a time slot for reception of a relay signal from the base station based on the transmission mode of the base station, where the relay signal includes a relay of the broadcast signal transmitted from the broadcast transmitter to the base station, and receive, from the base station, the relay signal based on the monitored portion of the time slot.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a Basic Input/Output System (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting broadcast relay method in NR).

The code 935 may include instructions to implement aspects of the present disclosure, including instructions to support wireless communications. The code 935 may be stored in a non-transitory computer-readable medium such as system memory or other type of memory. In some cases, the code 935 may not be directly executed or executable by the processor 940 but may cause a computer (e.g., when compiled and executed) to perform functions described herein.

Figure 10:
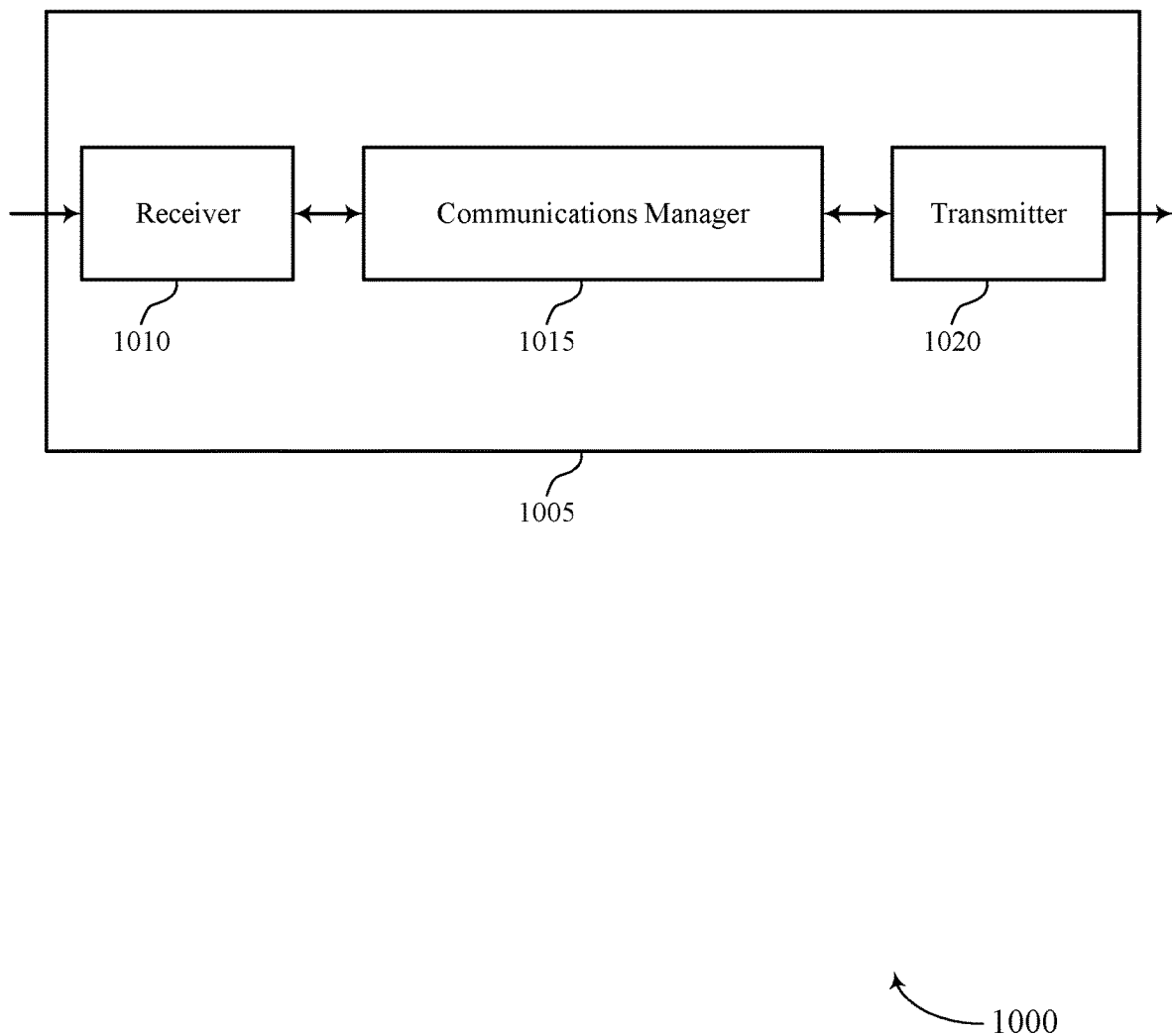
FIGS. 10 and 11 show block diagrams of devices that support broadcast relay method in NR in accordance with one or more aspects of the present disclosure.

FIG. 10 shows a block diagram 1000 of a device 1005 that supports broadcast relay method in NR in accordance with one or more aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to broadcast relay method in NR, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a broadcast reception capability of the base station, where the broadcast reception capability includes a capability to receive a broadcast signal from a broadcast transmitter, transmit, to the UE, a signal indicating the broadcast reception capability of the base station based on the determining, and communicate, with the UE, based on the broadcast reception capability at the base station. The communications manager 1015 may also transmit, to a UE, a configuration signal indicating a transmission mode of the base station, receive a broadcast signal based on a broadcast reception capability at the base station, the broadcast signal including one or more systematic information bits and one or more redundancy coding bits, and transmit, to the UE, a relay signal within at least a portion of a time slot based on the transmission mode of the base station, where the relay signal includes a relay of the broadcast signal received from the broadcast transmitter. The communications manager 1015 may also receive, from a UE, a first signal querying a broadcast reception capability of the base station, determine whether the base station includes a capability to receive a broadcast signal from a broadcast transmitter, transmit, to the UE, a second signal indicating the broadcast reception capability of the base station based on the determining, transmit, to the UE, a configuration signal indicating a transmission mode of the base station, and transmit, to the UE, a relay signal within at least a portion of a time slot based on the transmission mode of the base station. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with one or more aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with one or more aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
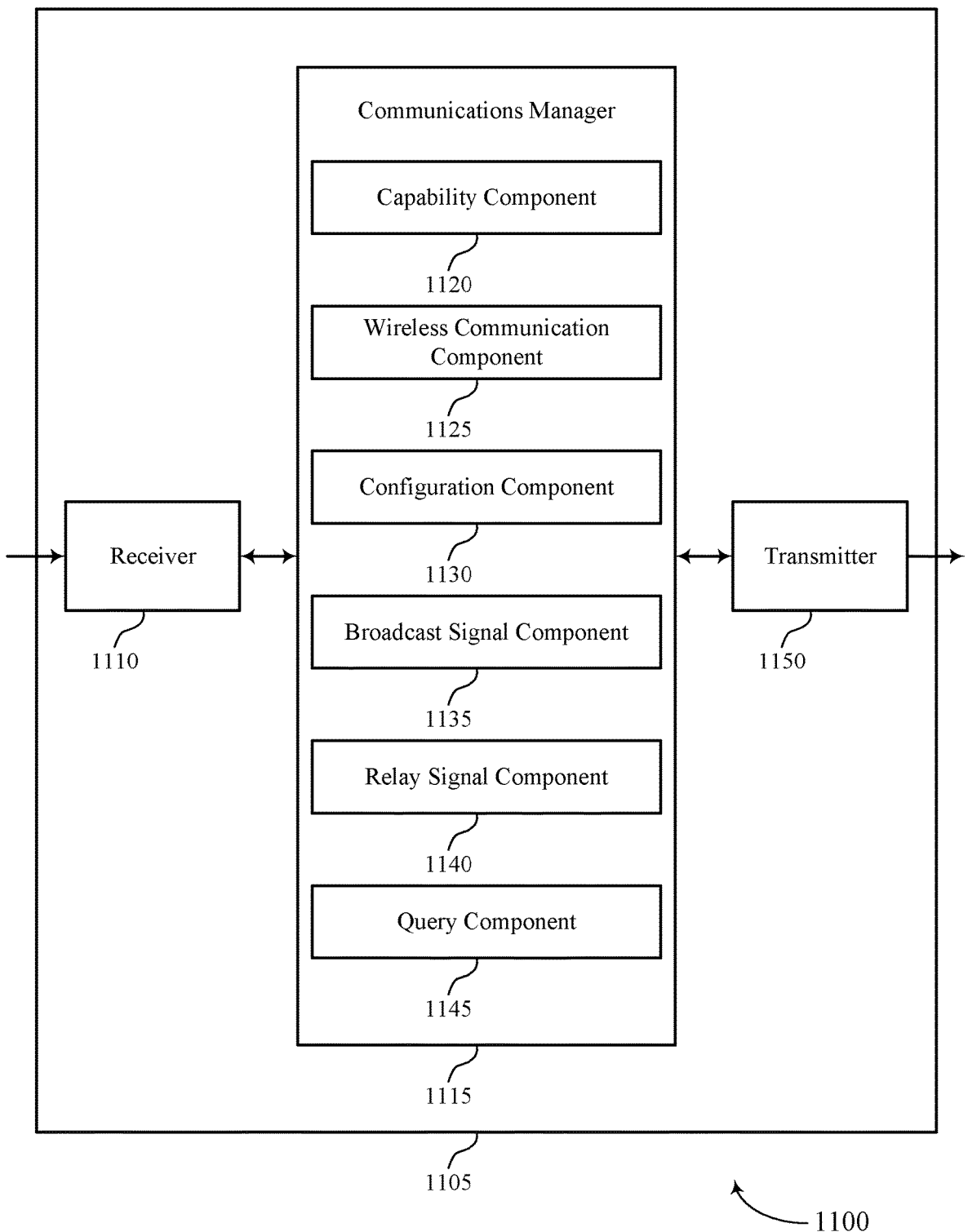

FIG. 11 shows a block diagram 1100 of a device 1105 that supports broadcast relay method in NR in accordance with one or more aspects of the present disclosure. The device 1105 may be an example of aspects of a device 1005, or a base station 105 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to broadcast relay method in NR, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a capability component 1120, a wireless communication component 1125, a configuration component 1130, a broadcast signal component 1135, a relay signal component 1140, and a query component 1145. The communications manager 1115 may be an example of aspects of the communications manager 1310 described herein.

The capability component 1120 may determine a broadcast reception capability of the base station, where the broadcast reception capability includes a capability to receive a broadcast signal from a broadcast transmitter and transmit, to the UE, a signal indicating the broadcast reception capability of the base station based on the determining. The wireless communication component 1125 may communicate, with the UE, based on the broadcast reception capability at the base station.

The configuration component 1130 may transmit, to a UE, a configuration signal indicating a transmission mode of the base station. The broadcast signal component 1135 may receive a broadcast signal based on a broadcast reception capability at the base station, the broadcast signal including one or more systematic information bits and one or more redundancy coding bits. The relay signal component 1140 may transmit, to the UE, a relay signal within at least a portion of a time slot based on the transmission mode of the base station, where the relay signal includes a relay of the broadcast signal received from the broadcast transmitter.

The query component 1145 may receive, from a UE, a first signal querying a broadcast reception capability of the base station. The capability component 1120 may determine whether the base station includes a capability to receive a broadcast signal from a broadcast transmitter and transmit, to the UE, a second signal indicating the broadcast reception capability of the base station based on the determining. The configuration component 1130 may transmit, to the UE, a configuration signal indicating a transmission mode of the base station. The relay signal component 1140 may transmit, to the UE, a relay signal within at least a portion of a time slot based on the transmission mode of the base station.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
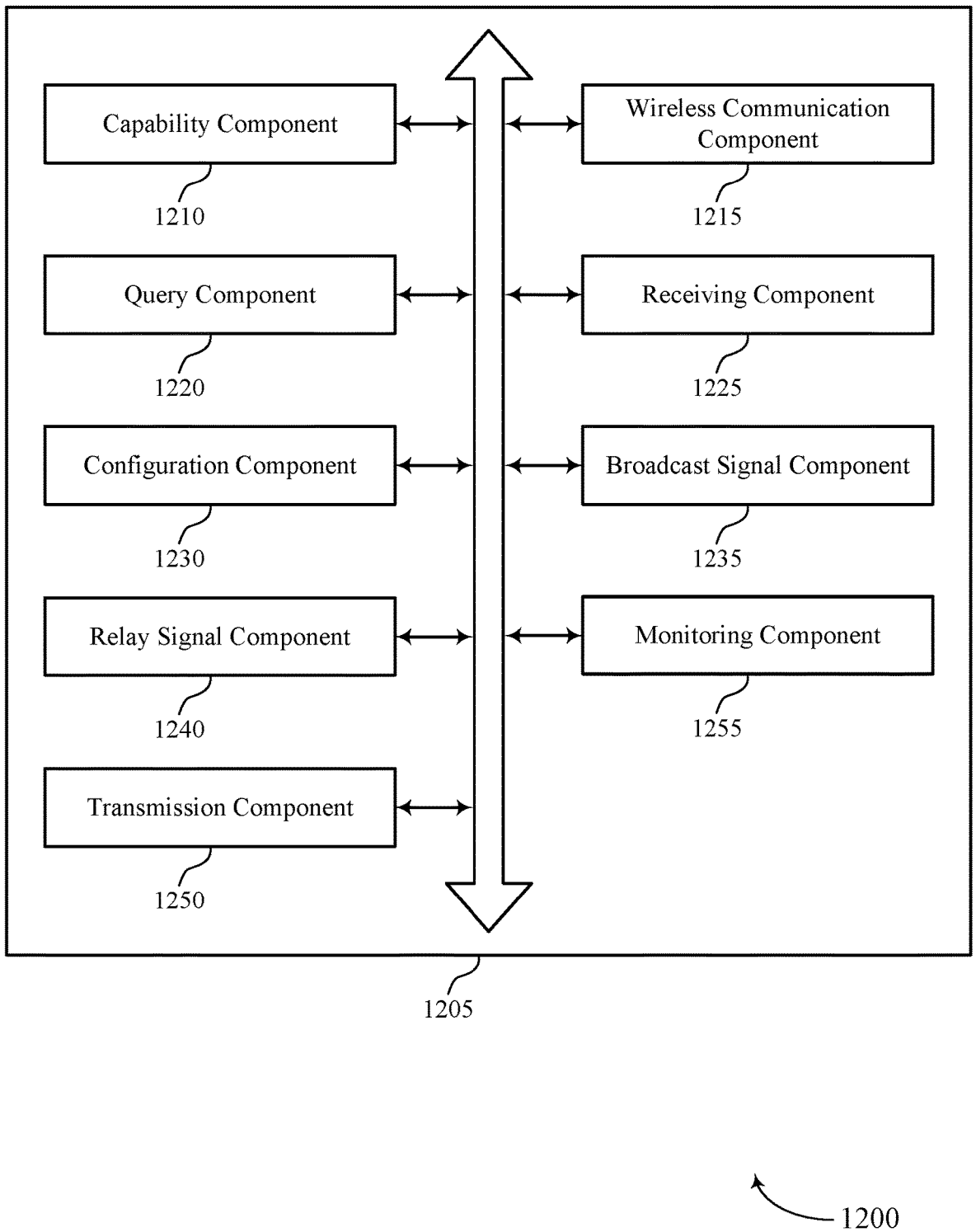
FIG. 12 shows a block diagram of a communications manager that supports broadcast relay method in NR in accordance with one or more aspects of the present disclosure.

FIG. 12 shows a block diagram 1200 of a communications manager 1205 that supports broadcast relay method in NR in accordance with one or more aspects of the present disclosure. The communications manager 1205 may be an example of aspects of a communications manager 1015, a communications manager 1115, or a communications manager 1310 described herein. The communications manager 1205 may include a capability component 1210, a wireless communication component 1215, a query component 1220, a receiving component 1225, a configuration component 1230, a broadcast signal component 1235, a relay signal component 1240, a transmission component 1250, and a monitoring component 1255. Each of these modules may communicate, directly or indirectly, with one another (e.g., via one or more buses).

The capability component 1210 may determine a broadcast reception capability of the base station, where the broadcast reception capability includes a capability to receive a broadcast signal from a broadcast transmitter. In some examples, the capability component 1210 may transmit, to the UE, a signal indicating the broadcast reception capability of the base station based on the determining. The wireless communication component 1215 may communicate, with the UE, based on the broadcast reception capability at the base station.

In some examples, the capability component 1210 may determine whether the base station includes a capability to receive a broadcast signal from a broadcast transmitter. In some examples, the capability component 1210 may transmit, to the UE, the signal indicating that the base station includes the capability to receive the broadcast signal from the broadcast transmitter.

In some examples, the capability component 1210 may determine that the base station is incapable of receiving the broadcast signal from the broadcast transmitter. In some examples, the capability component 1210 may transmit, to the UE, the signal indicating that the base station is incapable of receiving the broadcast signal from the broadcast transmitter.

In some examples, the capability component 1210 may determine that the base station is incapable of receiving the broadcast signal from the broadcast transmitter. In some examples, the query component 1220 may transmit, to a second base station, a third signal querying the broadcast reception capability at the second base station. The receiving component 1225 may receive, from the second base station, a fourth signal indicating that the second base station includes a capability to receive the broadcast signal from the broadcast transmitter, where transmitting the signal is based on receiving the fourth signal.

In some examples, the capability component 1210 may broadcast the signal indicating the broadcast reception capability using a first frequency, where the broadcast signal is received from the broadcast transmitter using a second frequency. In some examples, the receiving component 1225 may receive, from a UE, a second signal querying the broadcast reception capability of the base station, where transmitting the signal indicating the broadcast reception capability is based on the second signal. In some cases, the broadcast reception capability at the base station is based on at least one of a circuitry included in the base station, a broadcast reception quality at the base station, a current load at the base station, or a combination thereof. In some cases, the broadcast transmitter includes an NR broadcast transmitter and the base station includes an NR small cell. In some cases, a distance between the broadcast transmitter and the UE is greater than a distance between the base station and the UE.

The configuration component 1230 may transmit, to a UE, a configuration signal indicating a transmission mode of the base station. The broadcast signal component 1235 may receive a broadcast signal based on a broadcast reception capability at the base station, the broadcast signal including one or more systematic information bits and one or more redundancy coding bits. The relay signal component 1240 may transmit, to the UE, a relay signal within at least a portion of a time slot based on the transmission mode of the base station, where the relay signal includes a relay of the broadcast signal received from the broadcast transmitter.

In some examples, the relay signal component 1240 may configure the UE to identify a start time for reception of the relay signal from the base station based on the transmission mode of the base station. In some examples, the relay signal component 1240 may configure the UE to initiate monitoring of the time slot at the identified start time for reception of the relay signal from the base station.

The transmission component 1250 may transmit, to the UE, a physical downlink control channel based on the transmission mode of the base station, where the physical downlink control channel is transmitted in a time instance identified in the configuration signal. The monitoring component 1255 may configure the UE to initiate monitoring at least the portion of the time slot for reception of the relay signal from the base station based on receiving the physical downlink control channel. In some cases, the broadcast reception capability at the base station is based on at least one of a circuitry included in the base station, a broadcast reception quality at the base station, a current load at the base station, or a combination thereof.

In some examples, the relay signal component 1240 may transmit, to the UE, a beamformed transmission including the relay signal. In some cases, a timing boundary associated with a transmission of the relay signal is equal to a timing boundary associated with a reception of the broadcast signal. In some cases, the relay signal includes an in-band signal, or an out-of-band signal, or both. In some cases, the relay signal is transmitted using millimeter wave frequencies and the broadcast signal is transmitted using sub-6 frequencies. In some cases, the broadcast transmitter includes an NR broadcast transmitter and the base station includes an NR small cell.

The query component 1220 may receive, from a UE, a first signal querying a broadcast reception capability of the base station. In some examples, the capability component 1210 may determine whether the base station includes a capability to receive a broadcast signal from a broadcast transmitter. In some examples, the capability component 1210 may transmit, to the UE, a second signal indicating the broadcast reception capability of the base station based on the determining. In some examples, the configuration component 1230 may transmit, to the UE, a configuration signal indicating a transmission mode of the base station. In some examples, the relay signal component 1240 may transmit, to the UE, a relay signal within at least a portion of a time slot based on the transmission mode of the base station.

In some examples, broadcast signal component 1235 may receive, from the broadcast transmitter, the broadcast signal based on the broadcast reception capability at the base station, where the relay signal includes a relay of the broadcast signal received from the broadcast transmitter. In some examples, the relay signal component 1240 may transmit, to the UE, the second signal indicating that the base station includes the capability to receive the broadcast signal from the broadcast transmitter.

The relay signal component 1240 may configure the UE to identify a start time for reception of the relay signal from the base station based on the transmission mode of the base station. In some examples, the relay signal component 1240 may configure the UE to initiate monitoring of the time slot at the identified start time for reception of the relay signal from the base station.

In some examples, the transmission component 1250 may transmit, to the UE, a physical downlink control channel based on the transmission mode of the base station. In some examples, the monitoring component 1255 may configure the UE to initiate monitoring at least the portion of the time slot for reception of the relay signal from the base station based on receiving the physical downlink control channel. In some cases, the broadcast reception capability at the base station is based on at least one of a circuitry included in the base station, a broadcast reception quality at the base station, a current load at the base station, or a combination thereof. In some cases, the broadcast signal is received from at least one of a broadcast transmitter, a second base station, or a combination thereof. In some cases, the broadcast transmitter includes an NR broadcast transmitter and the base station includes an NR small cell.

Figure 13:
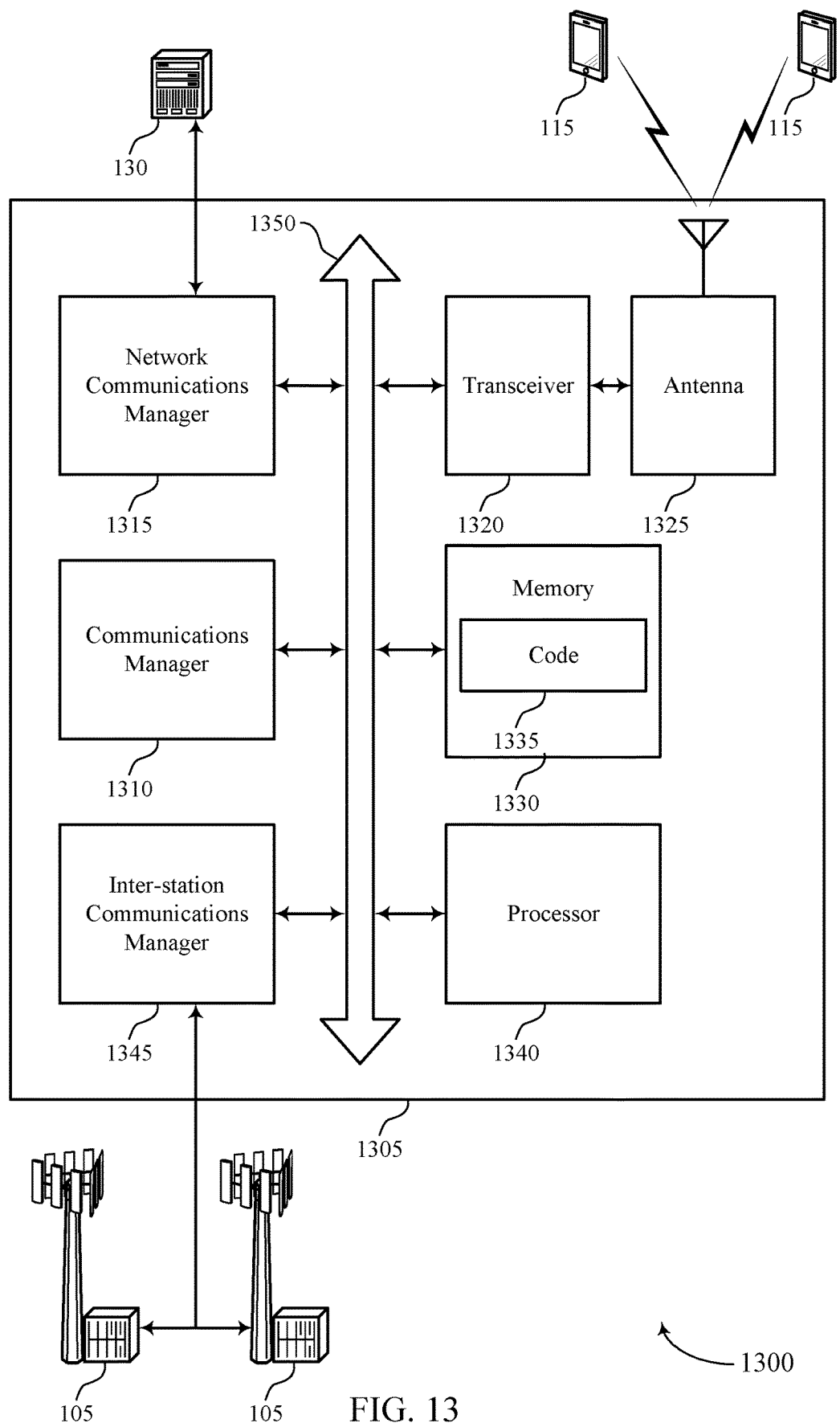
FIG. 13 shows a diagram of a system including a device that supports broadcast relay method in NR in accordance with one or more aspects of the present disclosure.

FIG. 13 shows a diagram of a system 1300 including a device 1305 that supports broadcast relay method in NR in accordance with one or more aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a broadcast reception capability of the base station, where the broadcast reception capability includes a capability to receive a broadcast signal from a broadcast transmitter, transmit, to the UE, a signal indicating the broadcast reception capability of the base station based on the determining, and communicate, with the UE, based on the broadcast reception capability at the base station. The communications manager 1310 may also transmit, to a UE, a configuration signal indicating a transmission mode of the base station, receive a broadcast signal based on a broadcast reception capability at the base station, the broadcast signal including one or more systematic information bits and one or more redundancy coding bits, and transmit, to the UE, a relay signal within at least a portion of a time slot based on the transmission mode of the base station, where the relay signal includes a relay of the broadcast signal received from the broadcast transmitter. The communications manager 1310 may also receive, from a UE, a first signal querying a broadcast reception capability of the base station, determine whether the base station includes a capability to receive a broadcast signal from a broadcast transmitter, transmit, to the UE, a second signal indicating the broadcast reception capability of the base station based on the determining, transmit, to the UE, a configuration signal indicating a transmission mode of the base station, and transmit, to the UE, a relay signal within at least a portion of a time slot based on the transmission mode of the base station.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting broadcast relay method in NR).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executed or executable by the processor 1340 but may cause a computer (e.g., when compiled and executed) to perform functions described herein.

Figure 14:
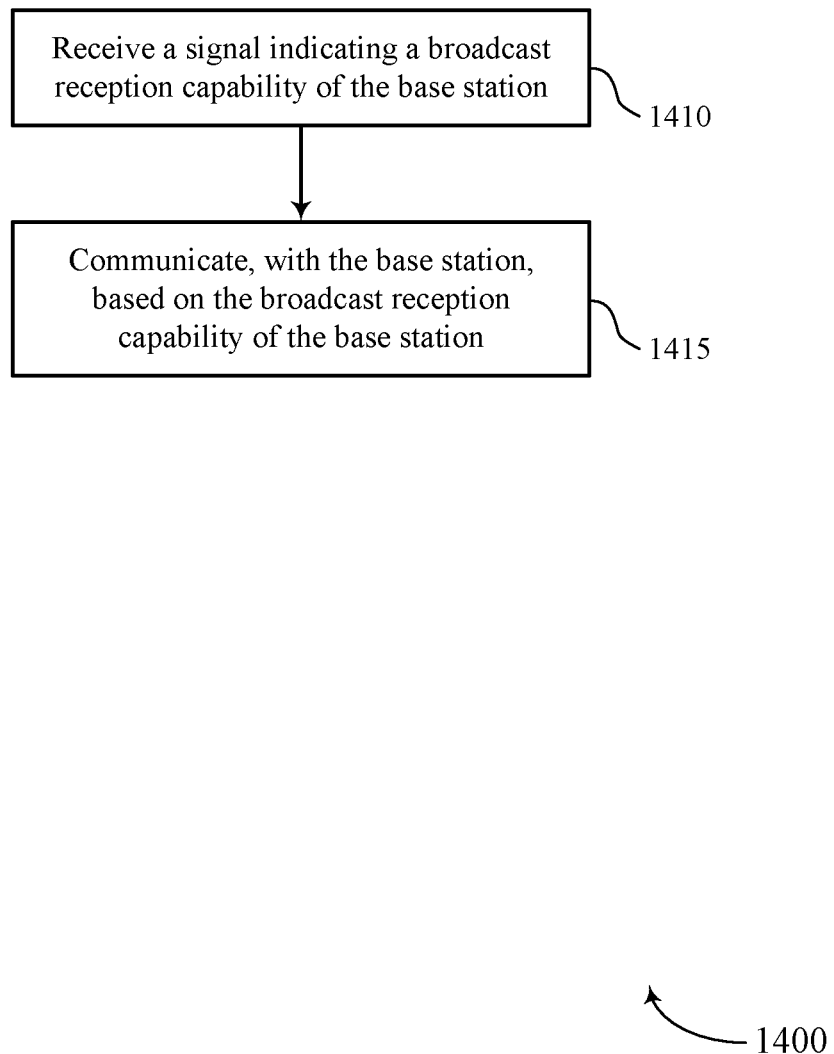
FIGS. 14 through 19 show flowcharts illustrating methods that support broadcast relay method in NR in accordance with one or more aspects of the present disclosure.

FIG. 14 shows a flowchart illustrating a method 1400 that supports broadcast relay method in NR in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1410, the UE may receive a signal indicating a broadcast reception capability of the base station. The operations of 1410 may be performed according to the methods described herein. In some examples, aspects of the operations of 1410 may be performed by a capability component as described with reference to FIGS. 6 through 9.

At 1415, the UE may communicate, with the base station, based on the broadcast reception capability of the base station. The operations of 1415 may be performed according to the methods described herein. In some examples, aspects of the operations of 1415 may be performed by a wireless communication component as described with reference to FIGS. 6 through 9.

In some examples, the UE may receive, from a broadcast transmitter, a broadcast signal including one or more multi-resolution messages.

Figure 15:
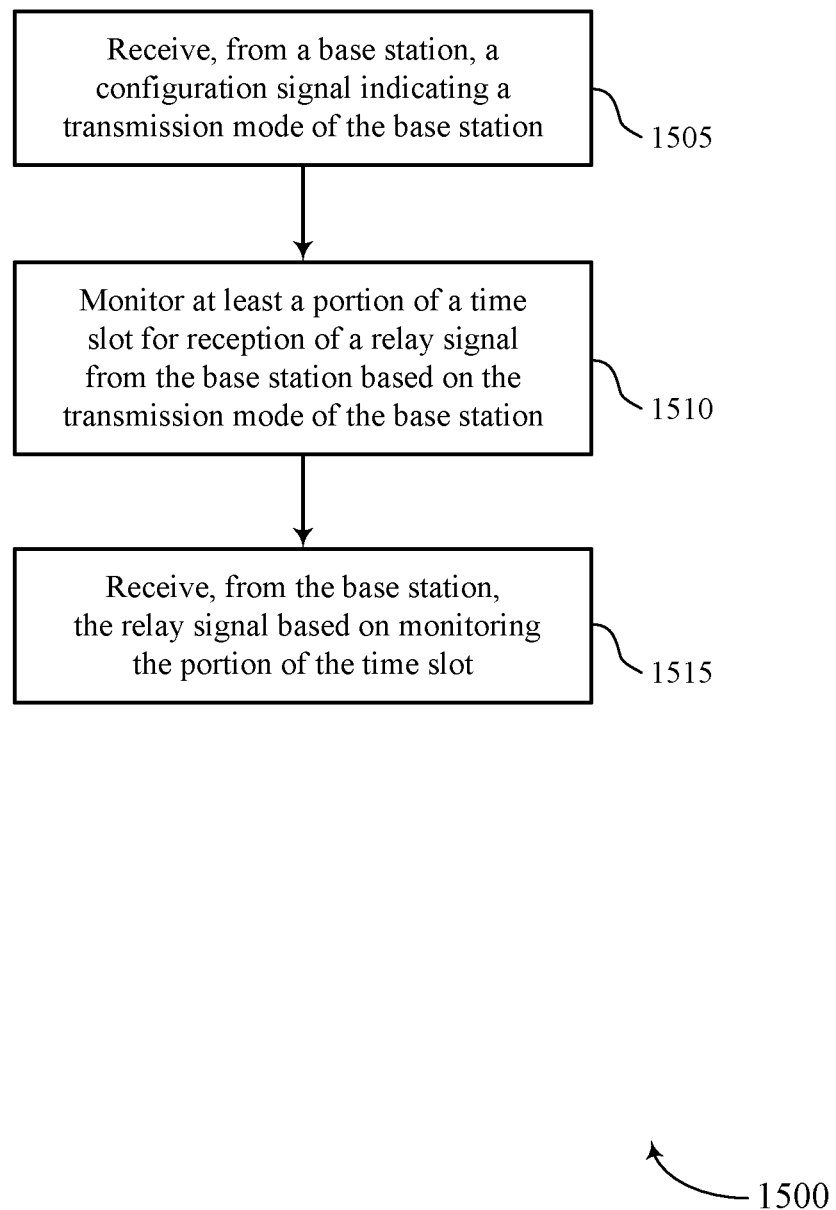

FIG. 15 shows a flowchart illustrating a method 1500 that supports broadcast relay method in NR in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration signal indicating a transmission mode of the base station. The operations of 1505 may be performed according to the methods described herein. In some examples, aspects of the operations of 1505 may be performed by a configuration component as described with reference to FIGS. 6 through 9.

At 1510, the UE may monitor at least a portion of a time slot for reception of a relay signal from the base station based on the transmission mode of the base station. In some cases, the relay signal includes a relay of a broadcast signal transmitted from a broadcast transmitter. The operations of 1510 may be performed according to the methods described herein. In some examples, aspects of the operations of 1510 may be performed by a monitoring component as described with reference to FIGS. 6 through 9.

At 1515, the UE may receive, from the base station, the relay signal based on monitoring the portion of the time slot. The operations of 1515 may be performed according to the methods described herein. In some examples, aspects of the operations of 1515 may be performed by a relay signal component as described with reference to FIGS. 6 through 9.

Figure 16:
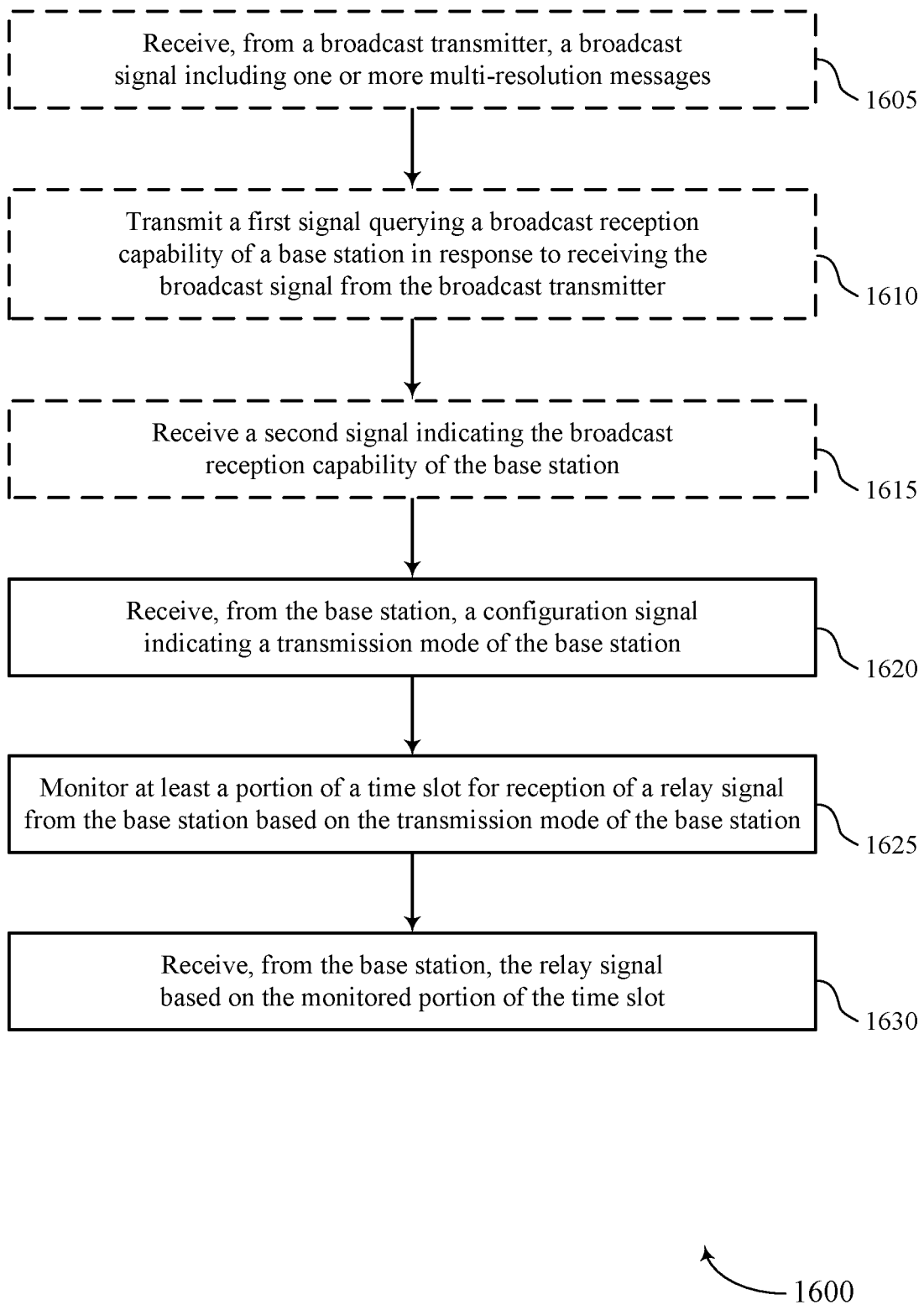

FIG. 16 shows a flowchart illustrating a method 1600 that supports broadcast relay method in NR in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a broadcast transmitter, a broadcast signal including one or more multi-resolution messages. The operations of 1605 may be performed according to the methods described herein. In some examples, aspects of the operations of 1605 may be performed by a broadcast signal component as described with reference to FIGS. 6 through 9.

At 1610, the UE may transmit a first signal querying a broadcast reception capability of a base station in response to receiving the broadcast signal from the broadcast transmitter. The operations of 1610 may be performed according to the methods described herein. In some examples, aspects of the operations of 1610 may be performed by a query component as described with reference to FIGS. 6 through 9.

At 1615, the UE may receive a second signal indicating the broadcast reception capability of the base station. The operations of 1615 may be performed according to the methods described herein. In some examples, aspects of the operations of 1615 may be performed by a capability component as described with reference to FIGS. 6 through 9.

At 1620, the UE may receive, from the base station, a configuration signal indicating a transmission mode of the base station. The operations of 1620 may be performed according to the methods described herein. In some examples, aspects of the operations of 1620 may be performed by a configuration component as described with reference to FIGS. 6 through 9.

At 1625, the UE may monitor at least a portion of a time slot for reception of a relay signal from the base station based on the transmission mode of the base station, where the relay signal includes a relay of the broadcast signal transmitted from the broadcast transmitter to the base station. The operations of 1625 may be performed according to the methods described herein. In some examples, aspects of the operations of 1625 may be performed by a monitoring component as described with reference to FIGS. 6 through 9.

At 1630, the UE may receive, from the base station, the relay signal based on the monitored portion of the time slot. The operations of 1630 may be performed according to the methods described herein. In some examples, aspects of the operations of 1630 may be performed by a relay signal component as described with reference to FIGS. 6 through 9.

Figure 17:
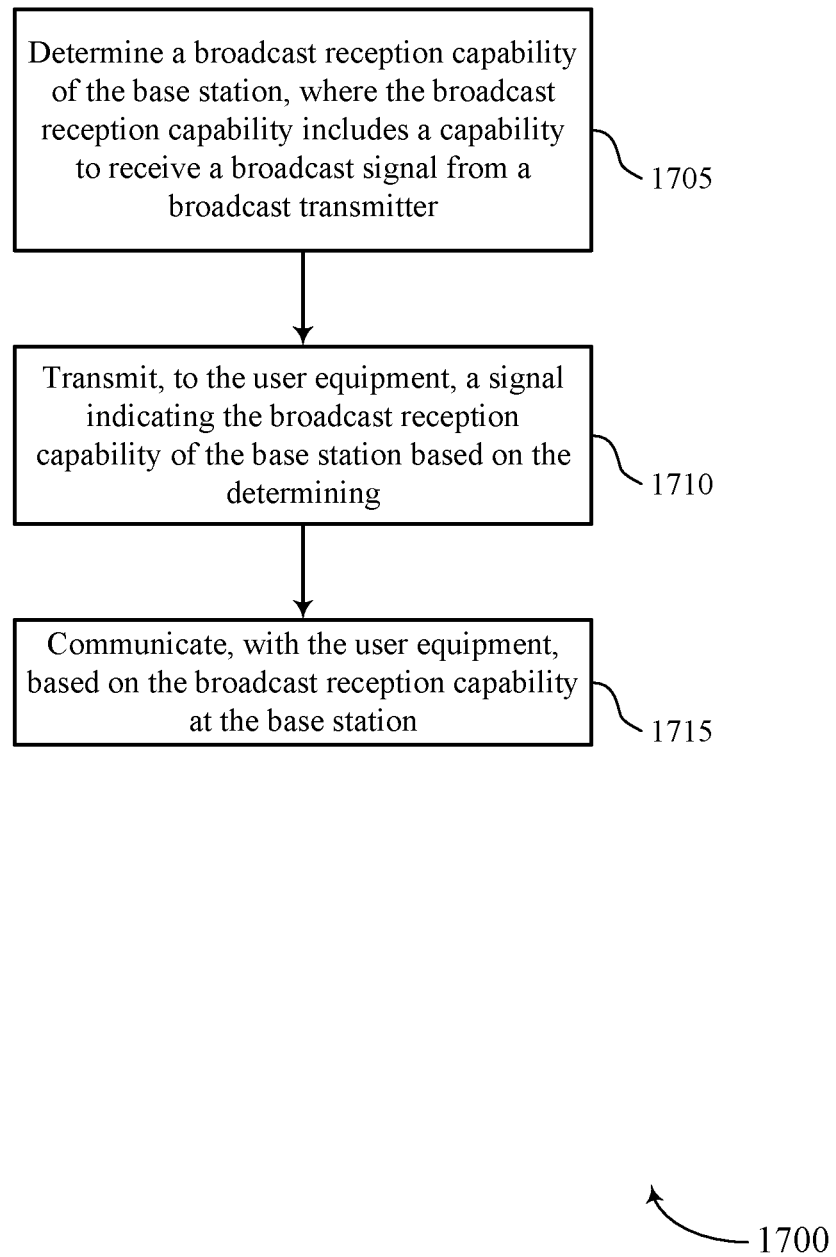

FIG. 17 shows a flowchart illustrating a method 1700 that supports broadcast relay method in NR in accordance with one or more aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may determine a broadcast reception capability of the base station, where the broadcast reception capability includes a capability to receive a broadcast signal from a broadcast transmitter. The operations of 1705 may be performed according to the methods described herein. In some examples, aspects of the operations of 1705 may be performed by a capability component as described with reference to FIGS. 10 through 13.

At 1710, the base station may transmit, to the UE, a signal indicating the broadcast reception capability of the base station based on the determining. The operations of 1710 may be performed according to the methods described herein. In some examples, aspects of the operations of 1710 may be performed by a capability component as described with reference to FIGS. 10 through 13.

At 1715, the base station may communicate, with the UE, based on the broadcast reception capability at the base station. The operations of 1715 may be performed according to the methods described herein. In some examples, aspects of the operations of 1715 may be performed by a wireless communication component as described with reference to FIGS. 10 through 13.

Figure 18:
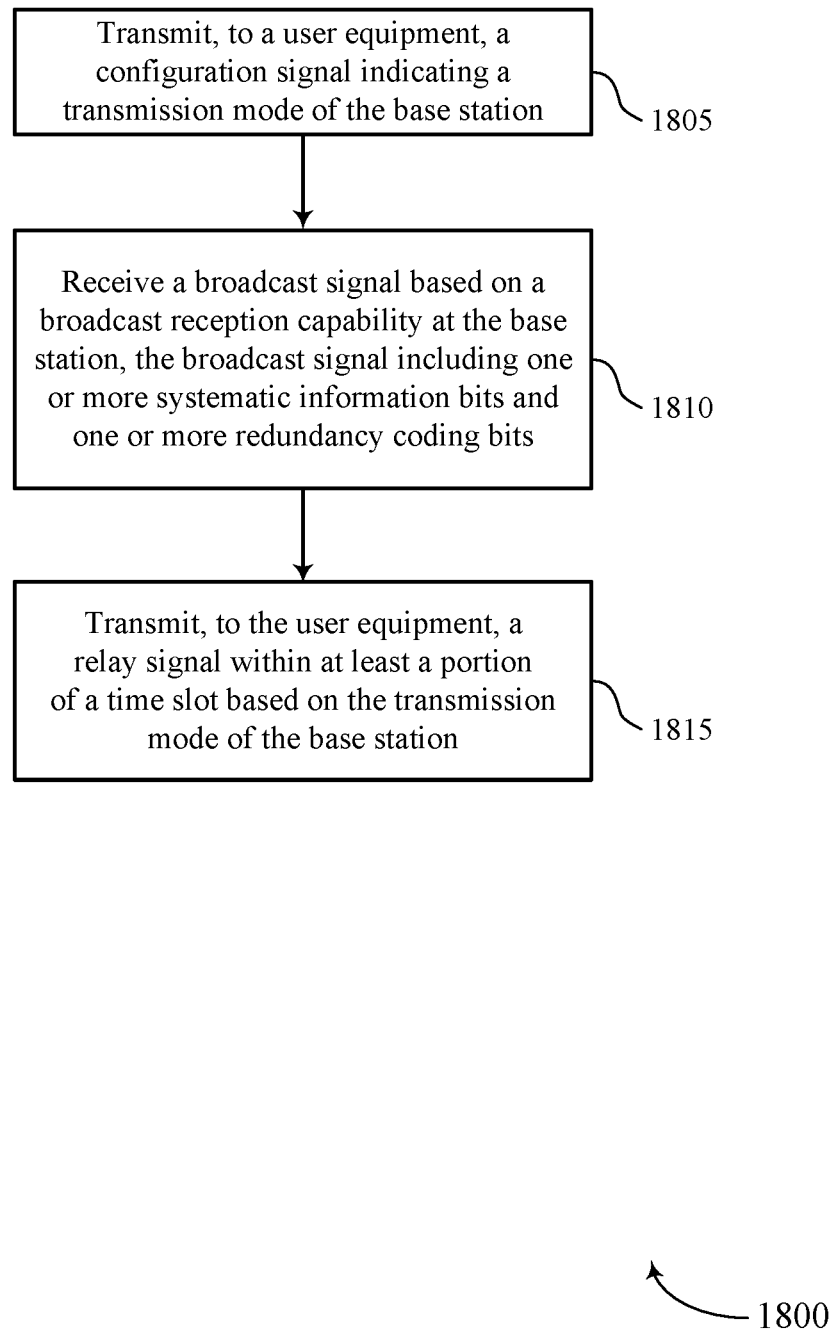

FIG. 18 shows a flowchart illustrating a method 1800 that supports broadcast relay method in NR in accordance with one or more aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a configuration signal indicating a transmission mode of the base station. The operations of 1805 may be performed according to the methods described herein. In some examples, aspects of the operations of 1805 may be performed by a configuration component as described with reference to FIGS. 10 through 13.

At 1810, the base station may receive a broadcast signal based on a broadcast reception capability at the base station, the broadcast signal including one or more systematic information bits and one or more redundancy coding bits. The operations of 1810 may be performed according to the methods described herein. In some examples, aspects of the operations of 1810 may be performed by a broadcast signal component as described with reference to FIGS. 10 through 13.

At 1815, the base station may transmit, to the UE, a relay signal within at least a portion of a time slot based on the transmission mode of the base station, where the relay signal includes a relay of the broadcast signal received from the broadcast transmitter. The operations of 1815 may be performed according to the methods described herein. In some examples, aspects of the operations of 1815 may be performed by a relay signal component as described with reference to FIGS. 10 through 13.

Figure 19:
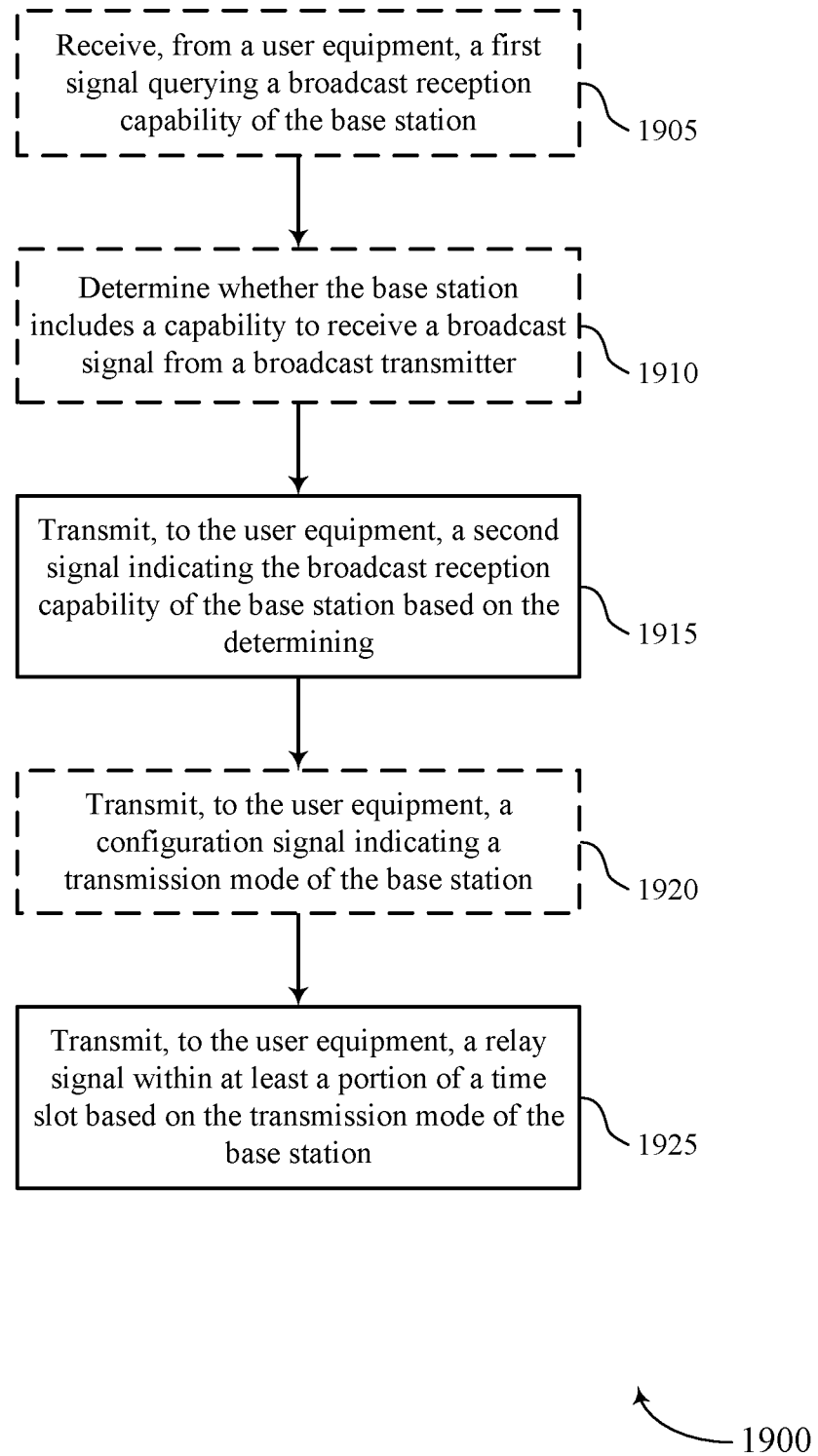

FIG. 19 shows a flowchart illustrating a method 1900 that supports broadcast relay method in NR in accordance with one or more aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, a first signal querying a broadcast reception capability of the base station. The operations of 1905 may be performed according to the methods described herein. In some examples, aspects of the operations of 1905 may be performed by a query component as described with reference to FIGS. 10 through 13.

At 1910, the base station may determine whether the base station includes a capability to receive a broadcast signal from a broadcast transmitter. The operations of 1910 may be performed according to the methods described herein. In some examples, aspects of the operations of 1910 may be performed by a capability component as described with reference to FIGS. 10 through 13.

At 1915, the base station may transmit, to the UE, a second signal indicating the broadcast reception capability of the base station based on the determining. The operations of 1915 may be performed according to the methods described herein. In some examples, aspects of the operations of 1915 may be performed by a capability component as described with reference to FIGS. 10 through 13.

At 1920, the base station may transmit, to the UE, a configuration signal indicating a transmission mode of the base station. The operations of 1920 may be performed according to the methods described herein. In some examples, aspects of the operations of 1920 may be performed by a configuration component as described with reference to FIGS. 10 through 13.

At 1925, the base station may transmit, to the UE, a relay signal within at least a portion of a time slot based on the transmission mode of the base station. The operations of 1925 may be performed according to the methods described herein. In some examples, aspects of the operations of 1925 may be performed by a relay signal component as described with reference to FIGS. 10 through 13.

It should be noted that the methods described herein describe possible implementations, and that the operations and the operations may be rearranged or otherwise modified and that other implementations are possible. Further, aspects from two or more of the methods may be combined.

Example 1

A method for wireless communication at a user equipment, comprising receiving a signal indicating a broadcast reception capability of a base station communicating, with the base station, based at least in part on the broadcast reception capability of the base station.

Example 2

The method of example 1, further comprising receiving, from a broadcast transmitter, a broadcast signal comprising one or more multi-resolution messages transmitting a second signal querying the broadcast reception capability of a base station in response to receiving the broadcast signal from the broadcast transmitter.

Example 3

The method of example 2, further comprising decoding at least one of the one or more multi-resolution messages based at least in part on receiving the broadcast signal from the broadcast transmitter determining that a data rate associated with the broadcast signal is less than a threshold based at least in part on decoding the at least one of the one or more multi-resolution messages, wherein transmitting the second signal is based at least in part on the determining.

Example 4

The method of any one of examples 1 through 3, wherein receiving the signal further comprises: receiving, from the base station, the signal indicating that the base station comprises a capability to receive the broadcast signal from the broadcast transmitter.

Example 5

The method of example 4, further comprising determining a link quality between the base station and the user equipment based at least in part on receiving the signal selecting the base station for reception of the broadcast signal based at least in part on the determined link quality, wherein communicating with the base station is based at least in part on the selecting.

Example 6

The method of any one of examples 1 through 5, wherein receiving the signal further comprises: receiving, from the base station, the signal indicating that the base station is incapable of receiving the broadcast signal from the broadcast transmitter.

Example 7

The method of example 6, further comprising transmitting, to a second base station, a second signal querying the broadcast reception capability of the second base station receiving, from the second base station, a third signal indicating that the second base station comprises a capability to receive the broadcast signal from the broadcast transmitter.

Example 8

The method of example 7, further comprising determining a first link quality between the base station and the user equipment based at least in part on receiving the signal determining a second link quality between the second base station and the user equipment based at least in part on receiving the third signal selecting the base station for reception of the broadcast signal based at least in part on the first link quality and the second link quality, wherein the second base station relays the broadcast signal to the base station.

Example 9

The method of example 8, wherein the first link quality is greater than the second link quality.

Example 10

The method of any one of examples 7 through 9, further comprising determining a link quality between the second base station and the user equipment based at least in part on receiving the third signal performing a handover procedure to establish a connection with the second base station based at least in part on the link quality satisfying a threshold.

Example 11

The method of any one of examples 7 through 10, wherein the signal and the second signal are the same signal.

Example 12

The method of any one of examples 7 through 11, wherein the signal and the second signal are different signals.

Example 13

The method of any one of examples 1 through 12, further comprising transmitting, to a central entity, a second signal querying the broadcast reception capability of the base station, wherein the second signal comprises an indication of a link quality between the base station and the user equipment.

Example 14

The method of example 13, wherein receiving the signal further comprises: receiving, from the central entity, the signal indicating that the base station comprises a capability to receive the broadcast signal from the broadcast transmitter.

Example 15

The method of any one of examples 1 through 14, wherein the broadcast reception capability at the base station is based at least in part on at least one of a circuitry included in the base station, a broadcast reception quality at the base station, a current load at the base station, or a combination thereof.

Example 16

The method of any one of examples 1 through 15, wherein a broadcast transmitter comprises a new radio broadcast transmitter and the base station comprises a new radio small cell.

Example 17

The method of any one of examples 1 through 16, wherein a distance between a broadcast transmitter and the user equipment is greater than a distance between the base station and the user equipment.

Example 18

The method of any one of examples 1 through 17, wherein a power of a broadcast transmitter is higher than a power of the base station.

Example 19

The method of any one of Examples 1 through 18, further comprising transmitting a query to the base station regarding the broadcast reception capability of the base station, wherein receiving the signal indicating the broadcast reception capability of the base station is in response to the query.

Example 20

The method of any one of Examples 1 through 19, further comprising receiving, from a broadcast transmitter, a broadcast signal comprising one or more multi-resolution messages receiving, from the base station, a configuration signal indicating a transmission mode of the base station monitoring at least a portion of a time slot for reception of a relay signal from the base station based at least in part on the transmission mode of the base station, wherein the relay signal comprises a relay of the broadcast signal transmitted from the broadcast transmitter to the base station receiving, from the base station, the relay signal based at least in part on the monitored portion of the time slot.

Example 21

The method of example 20, wherein monitoring at least the portion of the time slot further comprises: identifying a start time for reception of the relay signal from the base station based at least in part on the transmission mode of the base station initiating the monitoring of the time slot at the identified start time for reception of the relay signal from the base station.

Example 22

The method of example 20, wherein monitoring at least the portion of the time slot further comprises: monitoring one or more time instances for reception of a physical downlink control channel based at least in part on the transmission mode of the base station receiving, from the base station, the physical downlink control channel based at least in part on monitoring the one or more time instances initiating monitoring at least the portion of the time slot for reception of the relay signal from the base station based at least in part on receiving the physical downlink control channel.

Example 23

A method for wireless communication at a user equipment, comprising receiving, from a base station, a configuration signal indicating a transmission mode of the base station monitoring at least a portion of a time slot for reception of a relay signal from the base station based at least in part on the transmission mode of the base station, wherein the relay signal comprises a relay of a broadcast signal transmitted from a broadcast transmitter receiving, from the base station, the relay signal based at least in part on monitoring the portion of the time slot.

Example 24

The method of example 23, wherein monitoring at least the portion of the time slot further comprises: identifying a start time for reception of the relay signal from the base station based at least in part on the transmission mode of the base station initiating the monitoring of the time slot at the identified start time for reception of the relay signal from the base station.

Example 25

The method of any one of examples 23 through 24, wherein monitoring at least the portion of the time slot further comprises: receiving, from the base station, a physical downlink control channel based at least in part on the transmission mode of the base station initiating monitoring at least the portion of the time slot for reception of the relay signal from the base station based at least in part on receiving the physical downlink control channel.

Example 26

The method of example 25, further comprising monitoring one or more time instances for reception of the physical downlink control channel based at least in part on the transmission mode of the base station, wherein receiving the physical downlink control channel is further based at least in part on monitoring the one or more time instances.

Example 27

The method of example 26, wherein the one or more time instances are identified based at least in part on at least one of the transmission mode of the base station, the configuration signal, or a combination thereof.

Example 28

The method of any one of examples 23 through 27, further comprising receiving, from the broadcast transmitter, the broadcast signal comprising one or more multi-resolution messages decoding at least one of the one or more multi-resolution messages based at least in part on receiving the broadcast signal from the broadcast transmitter selecting the base station for reception of the broadcast signal based at least in part on decoding the at least one of the one or more multi-resolution messages and a broadcast reception capability at the base station, wherein receiving the relay signal from the base station is based at least in part on selecting the base station.

Example 29

The method of example 28, wherein the broadcast reception capability at the base station is based at least in part on at least one of a circuitry included in the base station, a broadcast reception quality at the base station, a current load at the base station, or a combination thereof.

Example 30

The method of any one of examples 23 through 29, further comprising monitoring for one or more broadcast transmissions from the broadcast transmitter.

Example 31

The method of any one of examples 23 through 30, wherein receiving the relay signal further comprises: receiving, from the base station, a beamformed transmission comprising the relay signal.

Example 32

The method of any one of examples 23 through 31, wherein a timing boundary associated with a reception of the relay signal is equal to a timing boundary associated with a reception of the broadcast signal.

Example 33

The method of any one of examples 23 through 32, wherein the relay signal comprises an in-band signal, or an out-of-band signal, or both.

Example 34

The method of any one of examples 23 through 33, wherein the relay signal is transmitted using millimeter wave frequencies and the broadcast signal is transmitted using sub-6 frequencies.

Example 35

The method of any one of examples 23 through 34, wherein the broadcast transmitter comprises a new radio broadcast transmitter and the base station comprises a new radio small cell.

Example 36

A method for wireless communication at a base station, comprising determining a broadcast reception capability of the base station, wherein the broadcast reception capability comprises a capability to receive a broadcast signal from a broadcast transmitter transmitting, to the user equipment, a signal indicating the broadcast reception capability of the base station based at least in part on the determining communicating, with the user equipment, based at least in part on the broadcast reception capability at the base station.

Example 37

The method of example 36, wherein transmitting the signal further comprises: determining that the base station comprises a capability to receive the broadcast signal from the broadcast transmitter transmitting, to the user equipment, the signal indicating that the base station comprises the capability to receive the broadcast signal from the broadcast transmitter.

Example 38

The method of any one of examples 37 through 37, further comprising determining a first link quality between the base station and the user equipment based at least in part on receiving the second signal determining a second link quality between the second base station and the user equipment based at least in part on receiving the fourth signal selecting the base station for reception of the broadcast signal based at least in part on the first link quality and the second link quality, wherein the second base station relays the broadcast signal to the base station.

Example 39

The method of [[</w>Example 36|| any one of Examples 36 through 38, wherein transmitting the signal further comprises: determining that the base station is incapable of receiving the broadcast signal from the broadcast transmitter transmitting, to the user equipment, the signal indicating that the base station is incapable of receiving the broadcast signal from the broadcast transmitter.

Example 40

The method of any one of examples 36 through 39, further comprising determining that the base station is incapable of receiving the broadcast signal from the broadcast transmitter transmitting, to a second base station, a third signal querying the broadcast reception capability at the second base station receiving, from the second base station, a fourth signal indicating that the second base station comprises a capability to receive the broadcast signal from the broadcast transmitter, wherein transmitting the signal is based at least in part on receiving the fourth signal.

Example 41

The method of any one of examples 36 through 40, wherein transmitting the signal indicating the broadcast reception capability further comprising broadcasting the signal indicating the broadcast reception capability using a first frequency, wherein the broadcast signal is received from the broadcast transmitter using a second frequency.

Example 42

The method of any one of examples 36 through 41, further comprising receiving, from a user equipment, a second signal querying the broadcast reception capability of the base station, wherein transmitting the signal indicating the broadcast reception capability is based at least in part on the second signal.

Example 43

The method of any one of examples 36 through 42, wherein the broadcast reception capability at the base station is based at least in part on at least one of a circuitry included in the base station, a broadcast reception quality at the base station, a current load at the base station, or a combination thereof.

Example 44

The method of any one of examples 36 through 43, wherein the broadcast transmitter comprises a new radio broadcast transmitter and the base station comprises a new radio small cell.

Example 45

The method of any one of examples 36 through 44, wherein a distance between the broadcast transmitter and the user equipment is greater than a distance between the base station and the user equipment.

Example 46

The method of example 36, further comprising receiving, from the user equipment, a first signal querying the broadcast reception capability of the base station, wherein transmitting the signal indicating the broadcast reception capability is based on receiving the first signal transmitting, to the user equipment, a configuration signal indicating a transmission mode of the base station transmitting, to the user equipment, a relay signal within at least a portion of a time slot based at least in part on the transmission mode of the base station.

Example 47

The method of example 46, further comprising configuring the user equipment to identify a start time for reception of the relay signal from the base station based at least in part on the transmission mode of the base station configuring the user equipment to initiate monitoring of the time slot at the identified start time for reception of the relay signal from the base station.

Example 48

The method of any one of examples 46 through 47, further comprising transmitting, to the user equipment, a physical downlink control channel based at least in part on the transmission mode of the base station configuring the user equipment to initiate monitoring at least the portion of the time slot for reception of the relay signal from the base station based at least in part on receiving the physical downlink control channel.

Example 49

The method of any one of examples 36 through 48, further comprising transmitting, to a second base station, a third signal querying the broadcast reception capability of the second base station receiving, from the second base station, a fourth signal indicating that the second base station comprises a capability to receive the broadcast signal from the broadcast transmitter.

Example 50

A method for wireless communication at a base station, comprising transmitting, to a user equipment, a configuration signal indicating a transmission mode of the base station receiving a broadcast signal based at least in part on a broadcast reception capability at the base station, the broadcast signal comprising one or more systematic information bits and one or more redundancy coding bits transmitting, to the user equipment, a relay signal within at least a portion of a time slot based at least in part on the transmission mode of the base station, wherein the relay signal comprises a relay of the broadcast signal received from the broadcast transmitter.

Example 51

The method of example 50, further comprising configuring the user equipment to identify a start time for reception of the relay signal from the base station based at least in part on the transmission mode of the base station configuring the user equipment to initiate monitoring of the time slot at the identified start time for reception of the relay signal from the base station.

Example 52

The method of any one of examples 50 through 51, further comprising transmitting, to the user equipment, a physical downlink control channel based at least in part on the transmission mode of the base station, wherein the physical downlink control channel is transmitted in a time instance identified in the configuration signal configuring the user equipment to initiate monitoring at least the portion of the time slot for reception of the relay signal from the base station based at least in part on receiving the physical downlink control channel.

Example 53

The method of any one of examples 50 through 52, wherein the broadcast reception capability at the base station is based at least in part on at least one of a circuitry included in the base station, a broadcast reception quality at the base station, a current load at the base station, or a combination thereof.

Example 54

The method of any one of examples 50 through 53, wherein transmitting the relay signal further comprises: transmitting, to the user equipment, a beamformed transmission comprising the relay signal.

Example 55

The method of any one of examples 50 through 54, wherein a timing boundary associated with a transmission of the relay signal is equal to a timing boundary associated with a reception of the broadcast signal.

Example 56

The method of any one of examples 50 through 55, wherein the broadcast signal is received from at least one of a broadcast transmitter, a second base station, or a combination thereof.

Example 57

The method of any one of examples 50 through 56, wherein the relay signal comprises an in-band signal, or an out-of-band signal, or both.

Example 58

The method of any one of examples 50 through 57, wherein the relay signal is transmitted using millimeter wave frequencies and the broadcast signal is transmitted using sub-6 frequencies.

Example 59

The method of any one of examples 50 through 58, wherein the broadcast transmitter comprises a new radio broadcast transmitter and the base station comprises a new radio small cell.

Example 60

A method for wireless communication at a user equipment, comprising receiving, from a broadcast transmitter, a broadcast signal comprising one or more multi-resolution messages receiving a signal indicating a broadcast reception capability of the base station communicating, with the base station, based at least in part on the broadcast reception capability of the base station.

Example 61

The method of example 60, further comprising transmitting a second signal querying the broadcast reception capability of a base station in response to receiving the broadcast signal from the broadcast transmitter.

Example 62

The method of example 61, further comprising decoding at least one of the one or more multi-resolution messages based at least in part on receiving the broadcast signal from the broadcast transmitter determining that a data rate associated with the broadcast signal is less than a threshold based at least in part on decoding the at least one of the one or more multi-resolution messages, wherein transmitting the second signal is based at least in part on the determining.

Example 63

The method of any one of examples 60 through 62, wherein receiving the signal further comprises: receiving, from the base station, the signal indicating that the base station comprises a capability to receive the broadcast signal from the broadcast transmitter.

Example 64

The method of example 63, further comprising determining a link quality between the base station and the user equipment based at least in part on receiving the signal selecting the base station for reception of the broadcast signal based at least in part on the determined link quality, wherein communicating with the base station is based at least in part on the selecting.

Example 65

The method of any one of examples 60 through 64, wherein receiving the signal further comprises: receiving, from the base station, the signal indicating that the base station is incapable of receiving the broadcast signal from the broadcast transmitter.

Example 66

The method of example 65, further comprising transmitting, to a second base station, a second signal querying the broadcast reception capability of the second base station receiving, from the second base station, a third signal indicating that the second base station comprises a capability to receive the broadcast signal from the broadcast transmitter.

Example 67

The method of example 66, further comprising determining a first link quality between the base station and the user equipment based at least in part on receiving the signal determining a second link quality between the second base station and the user equipment based at least in part on receiving the third signal selecting the base station for reception of the broadcast signal based at least in part on the first link quality and the second link quality, wherein the second base station relays the broadcast signal to the base station.

Example 68

The method of example 67, wherein the first link quality is greater than the second link quality.

Example 69

The method of any one of examples 66 through 68, further comprising determining a link quality between the second base station and the user equipment based at least in part on receiving the third signal performing a handover procedure to establish a connection with the second base station based at least in part on the link quality satisfying a threshold.

Example 70

The method of any one of examples 66 through 69, wherein the signal and the second signal are the same signal.

Example 71

The method of any one of examples 66 through 70, wherein the signal and the second signal are different signals.

Example 72

The method of any one of examples 60 through 71, further comprising transmitting, to a central entity, a second signal querying the broadcast reception capability of the base station, wherein the second signal comprises an indication of a link quality between the base station and the user equipment.

Example 73

The method of example 72, wherein receiving the signal further comprises: receiving, from the central entity, the signal indicating that the base station comprises a capability to receive the broadcast signal from the broadcast transmitter.

Example 74

The method of any one of examples 60 through 73, wherein the broadcast reception capability at the base station is based at least in part on at least one of a circuitry included in the base station, a broadcast reception quality at the base station, a current load at the base station, or a combination thereof.

Example 75

The method of any one of examples 60 through 74, wherein the broadcast transmitter comprises a new radio broadcast transmitter and the base station comprises a new radio small cell.

Example 76

The method of any one of examples 60 through 75, wherein a distance between the broadcast transmitter and the user equipment is greater than a distance between the base station and the user equipment.

Example 77

A method for wireless communication at a user equipment, comprising receiving, from a broadcast transmitter, a broadcast signal comprising one or more multi-resolution messages transmitting a first signal querying a broadcast reception capability of a base station in response to receiving the broadcast signal from the broadcast transmitter receiving a second signal indicating the broadcast reception capability of the base station receiving, from the base station, a configuration signal indicating a transmission mode of the base station monitoring at least a portion of a time slot for reception of a relay signal from the base station based at least in part on the transmission mode of the base station, wherein the relay signal comprises a relay of the broadcast signal transmitted from the broadcast transmitter to the base station receiving, from the base station, the relay signal based at least in part on the monitored portion of the time slot.

Example 78

The method of example 77, further comprising decoding at least one of the one or more multi-resolution messages based at least in part on receiving the broadcast signal from the broadcast transmitter determining that a data rate associated with the broadcast signal is less than a threshold based at least in part on decoding the at least one of the one or more multi-resolution messages, wherein transmitting the first signal is based at least in part on the determining.

Example 79

The method of any one of examples 77 through 78, wherein receiving the second signal further comprises: receiving, from the base station, the second signal indicating that the base station comprises a capability to receive the broadcast signal from the broadcast transmitter.

Example 80

The method of any one of examples 77 through 79, wherein monitoring at least the portion of the time slot further comprises: identifying a start time for reception of the relay signal from the base station based at least in part on the transmission mode of the base station initiating the monitoring of the time slot at the identified start time for reception of the relay signal from the base station.

Example 81

The method of any one of examples 77 through 80, wherein monitoring at least the portion of the time slot further comprises: monitoring one or more time instances for reception of a physical downlink control channel based at least in part on the transmission mode of the base station receiving, from the base station, the physical downlink control channel based at least in part on monitoring the one or more time instances initiating monitoring at least the portion of the time slot for reception of the relay signal from the base station based at least in part on receiving the physical downlink control channel.

Example 82

The method of any one of examples 77 through 81, wherein receiving the second signal further comprises: receiving, from the base station, the second signal indicating that the base station is incapable of receiving the broadcast signal from the broadcast transmitter.

Example 83

The method of any one of examples 77 through 82, wherein the broadcast reception capability at the base station is based at least in part on at least one of a circuitry included in the base station, a broadcast reception quality at the base station, a current load at the base station, or a combination thereof.

Example 84

The method of any one of examples 77 through 83, wherein the broadcast transmitter comprises a new radio broadcast transmitter and the base station comprises a new radio small cell.

Example 85

A method for wireless communication at a base station, comprising receiving, from a user equipment, a first signal querying a broadcast reception capability of the base station determining whether the base station comprises a capability to receive a broadcast signal from a broadcast transmitter transmitting, to the user equipment, a second signal indicating the broadcast reception capability of the base station based at least in part on the determining transmitting, to the user equipment, a configuration signal indicating a transmission mode of the base station transmitting, to the user equipment, a relay signal within at least a portion of a time slot based at least in part on the transmission mode of the base station.

Example 86

The method of example 85, further comprising receiving, from the broadcast transmitter, the broadcast signal based at least in part on the broadcast reception capability at the base station, wherein the relay signal comprises a relay of the broadcast signal received from the broadcast transmitter.

Example 87

The method of any one of examples 85 through 86, wherein transmitting the second signal further comprises: transmitting, to the user equipment, the second signal indicating that the base station comprises the capability to receive the broadcast signal from the broadcast transmitter.

Example 88

The method of any one of examples 85 through 87, further comprising configuring the user equipment to identify a start time for reception of the relay signal from the base station based at least in part on the transmission mode of the base station configuring the user equipment to initiate monitoring of the time slot at the identified start time for reception of the relay signal from the base station.

Example 89

The method of any one of examples 85 through 88, further comprising transmitting, to the user equipment, a physical downlink control channel based at least in part on the transmission mode of the base station configuring the user equipment to initiate monitoring at least the portion of the time slot for reception of the relay signal from the base station based at least in part on receiving the physical downlink control channel.

Example 90

The method of any one of examples 85 through 89, wherein the broadcast reception capability at the base station is based at least in part on at least one of a circuitry included in the base station, a broadcast reception quality at the base station, a current load at the base station, or a combination thereof.

Example 91

An apparatus for wireless communication at a base station comprising at least one means for performing a method of any one of examples 1 through 23.

Example 92

An apparatus for wireless communication at a base station comprising a processor and memory couple to the processor, the processor and memory configured to cause the apparatus to perform a method of any one of examples 1 through 23.

Example 93

A non-transitory computer-readable medium storing code for wireless communication at a base station comprising a processor and memory couple to the processor, the processor and memory configured to perform a method of any one of examples 1 through 23.

Example 94

An apparatus for wireless communication at a base station comprising at least one means for performing a method of any one of examples 23 through 36.

Example 95

An apparatus for wireless communication at a base station comprising a processor and memory couple to the processor, the processor and memory configured to cause the apparatus to perform a method of any one of examples 23 through 36.

Example 96

A non-transitory computer-readable medium storing code for wireless communication at a base station comprising a processor and memory couple to the processor, the processor and memory configured to perform a method of any one of examples 23 through 36.

Example 97

An apparatus for wireless communication at a base station comprising at least one means for performing a method of any one of examples 36 through 50.

Example 98

An apparatus for wireless communication at a base station comprising a processor and memory couple to the processor, the processor and memory configured to cause the apparatus to perform a method of any one of examples 36 through 50.

Example 99

A non-transitory computer-readable medium storing code for wireless communication at a base station comprising a processor and memory couple to the processor, the processor and memory configured to cause the apparatus to perform a method of any one of examples 36 through 50.

Example 100

An apparatus for wireless communication at a base station comprising at least one means for performing a method of any one of examples 50 through 60.

Example 101

An apparatus for wireless communication at a base station comprising a processor and memory couple to the processor, the processor and memory configured to cause the apparatus to perform a method of any one of examples 50 through 60.

Example 102

A non-transitory computer-readable medium storing code for wireless communication at a base station comprising a processor and memory couple to the processor, the processor and memory configured to cause the apparatus to perform a method of any one of examples 50 through 60.

Example 103

An apparatus for wireless communication at a base station comprising at least one means for performing a method of any one of examples 60 through 77.

Example 104

An apparatus for wireless communication at a base station comprising a processor and memory couple to the processor, the processor and memory configured to cause the apparatus to perform a method of any one of examples 60 through 77.

Example 105

A non-transitory computer-readable medium storing code for wireless communication at a base station comprising a processor and memory couple to the processor, the processor and memory configured to cause the apparatus to perform a method of any one of examples 60 through 77.

Example 106

An apparatus for wireless communication at a base station comprising at least one means for performing a method of any one of examples 77 through 85.

Example 107

An apparatus for wireless communication at a base station comprising a processor and memory couple to the processor, the processor and memory configured to cause the apparatus to perform a method of any one of examples 77 through 85.

Example 108

A non-transitory computer-readable medium storing code for wireless communication at a base station comprising a processor and memory couple to the processor, the processor and memory configured to cause the apparatus to perform a method of any one of examples 77 through 85.

Example 109

An apparatus for wireless communication at a base station comprising at least one means for performing a method of any one of examples 85 through 90.

Example 110

An apparatus for wireless communication at a base station comprising a processor and memory couple to the processor, the processor and memory configured to cause the apparatus to perform a method of any one of examples 85 through 90.

Example 111

A non-transitory computer-readable medium storing code for wireless communication at a base station comprising a processor and memory couple to the processor, the processor and memory configured to cause the apparatus to perform a method of any one of examples 85 through 90.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. A broadcast transmitter may use more power than a macro cell. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may have different time alignments. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   receiving, from a broadcast transmitter, a broadcast signal comprising one or more multi-resolution messages, wherein the one or more multi-resolution messages comprises a first message having a first resolution and a second message having a second resolution, wherein the first resolution is higher than the second resolution;
   transmitting a first signal to query a broadcast reception capability of a base station in response to receiving the broadcast signal from the broadcast transmitter;
   receiving a second signal indicating the broadcast reception capability of the base station; and
   communicating, with the base station, based at least in part on the broadcast reception capability of the base station.

2. The method of claim 1, further comprising:
   decoding at least one of the one or more multi-resolution messages based at least in part on receiving the broadcast signal from the broadcast transmitter; and
   determining that a data rate associated with the broadcast signal is less than a threshold based at least in part on decoding the at least one of the one or more multi-resolution messages, wherein transmitting the second signal is based at least in part on the determining.

3. The method of claim 2, further comprising:
   selecting the base station for reception of the broadcast signal based at least in part on decoding the at least one of the one or more multi-resolution messages and the broadcast reception capability at the base station, wherein communicating with the base station is based at least in part on selecting the base station.

4. The method of claim 1, wherein receiving the second signal further comprises:
   receiving, from the base station, the second signal indicating that the base station comprises a capability to receive the broadcast signal from the broadcast transmitter.

5. The method of claim 4, further comprising:
   determining a link quality between the base station and the user equipment based at least in part on receiving the second signal; and
   selecting the base station for reception of the broadcast signal based at least in part on the determined link quality, wherein communicating with the base station is based at least in part on the selecting.

6. The method of claim 1, wherein receiving the second signal further comprises:
   receiving, from the base station, the second signal indicating that the base station is incapable of receiving the broadcast signal from the broadcast transmitter.

7. The method of claim 6, further comprising:
   transmitting, to a second base station, a third signal to query the broadcast reception capability of the second base station; and
   receiving, from the second base station, a fourth signal indicating that the second base station comprises a capability to receive the broadcast signal from the broadcast transmitter.

8. The method of claim 7, further comprising:
   determining a first link quality between the base station and the user equipment based at least in part on receiving the second signal;
   determining a second link quality between the second base station and the user equipment based at least in part on receiving the fourth signal; and
   selecting the base station for reception of the broadcast signal based at least in part on the first link quality and the second link quality, wherein the second base station relays the broadcast signal to the base station.

9. The method of claim 8, wherein the first link quality is greater than the second link quality.

10. The method of claim 7, further comprising:
    determining a link quality between the second base station and the user equipment based at least in part on receiving the fourth signal; and
    performing a handover procedure to establish a connection with the second base station based at least in part on the link quality satisfying a threshold.

11. The method of claim 7, wherein the first signal and the third signal are a same signal.

12. The method of claim 7, wherein the first signal and the third signal are different signals.

13. The method of claim 1, further comprising:
    transmitting, to a central entity, a third signal to query the broadcast reception capability of the base station, wherein the third signal comprises an indication of a link quality between the base station and the user equipment.

14. The method of claim 13, wherein receiving the second signal further comprises:
    receiving, from the central entity, the second signal indicating that the base station comprises a capability to receive the broadcast signal from the broadcast transmitter.

15. The method of claim 1, wherein the broadcast reception capability at the base station is based at least in part on at least one of a circuitry included in the base station, a broadcast reception quality at the base station, a current load at the base station, or a combination thereof.

16. The method of claim 1, wherein the broadcast transmitter comprises a new radio broadcast transmitter and the base station comprises a new radio small cell.

17. The method of claim 1, wherein a distance between the broadcast transmitter and the user equipment is greater than a distance between the base station and the user equipment.

18. The method of claim 1, wherein a power of the broadcast transmitter is higher than a power of the base station.

19. The method of claim 1, wherein receiving the second signal indicating the broadcast reception capability of the base station is in response to the first signal.

20. The method of claim 1, wherein the broadcast reception capability at the base station is based at least in part on a circuitry included in the base station and a current load at the base station.

21. An apparatus for wireless communication, comprising:
a processor; and
memory coupled to the processor, the processor configured to:
receive, from a broadcast transmitter, a broadcast signal comprising one or more multi-resolution messages, wherein the one or more multi-resolution messages comprises a first message having a first resolution and a second message having a second resolution, wherein the first resolution is higher than the second resolution;
transmit a first signal to query a broadcast reception capability of a base station in response to the receipt of the broadcast signal from the broadcast transmitter;
receive a second signal indicating the broadcast reception capability of the base station; and
communicate, with the base station, based at least in part on the broadcast reception capability of the base station.

22. The apparatus of claim 21, the processor further configured to:
decode at least one of the one or more multi-resolution messages based at least in part on receiving the broadcast signal from the broadcast transmitter; and
determine that a data rate associated with the broadcast signal is less than a threshold based at least in part on decoding the at least one of the one or more multi-resolution messages, wherein transmitting the second signal is based at least in part on the determining.

23. The apparatus of claim 22, the processor further configured to:
select the base station for reception of the broadcast signal based at least in part on decoding the at least one of the one or more multi-resolution messages and the broadcast reception capability at the base station, wherein communicate with the base station is based at least in part on the selection of the base station.

24. The apparatus of claim 21, wherein the processor configured to receive the second signal further configures the processor to:
receive, from the base station, the second signal indicating that the base station comprises a capability to receive the broadcast signal from the broadcast transmitter.

25. The apparatus of claim 24, the processor further configured to:
determine a link quality between the base station and a user equipment based at least in part on receiving the second signal; and
select the base station for reception of the broadcast signal based at least in part on the determined link quality, wherein the processor configured to communicate with the base station is based at least in part on the selection of the base station.

26. The apparatus of claim 21, wherein the processor configured to receive the second signal further configures the processor to:
receive, from the base station, the second signal indicating that the base station is incapable of receiving the broadcast signal from the broadcast transmitter.

27. The apparatus of claim 26, the processor further configured to:
transmit, to a second base station, a third signal to query the broadcast reception capability of the second base station; and
receive, from the second base station, a fourth signal that indicates that the second base station comprises a capability to receive the broadcast signal from the broadcast transmitter.

28. The apparatus of claim 27, the processor further configured to:
determine a first link quality between the base station and a user equipment based at least in part on receiving the second signal;
determine a second link quality between the second base station and the user equipment based at least in part on receiving the fourth signal; and
select the base station for reception of the broadcast signal based at least in part on the first link quality and the second link quality, wherein the second base station is to relay the broadcast signal to the base station.

29. The apparatus of claim 28, the processor further configured to:
determine a link quality between the second base station and the user equipment based at least in part on receiving the fourth signal; and
perform a handover procedure to establish a connection with the second base station based at least in part on the link quality satisfying a threshold.

30. The apparatus of claim 21, the processor further configured to:
transmit, to a central entity, a third signal to query the broadcast reception capability of the base station, wherein the third signal comprises an indication of a link quality between the base station and a user equipment.

31. The apparatus of claim 21, wherein the broadcast reception capability at the base station is based at least in part on at least one of a circuitry included in the base station, a broadcast reception quality at the base station, a current load at the base station, or a combination thereof.

32. The apparatus of claim 21, wherein the broadcast reception capability at the base station is based at least in part on a circuitry included in the base station and a current load at the base station.

33. The apparatus of claim 21, the processor further configured to:
decode at least one of the one or more multi-resolution messages based at least in part on receiving the broadcast signal from the broadcast transmitter; and
determine that a data rate associated with the broadcast signal is less than a threshold based at least in part on decoding the at least one of the one or more multi-resolution messages, wherein the processor configured to transmit the second signal is based at least in part on the determination.

34. An apparatus for wireless communication at a user equipment, comprising:
means for receiving, from a broadcast transmitter, a broadcast signal comprising one or more multi-resolution messages, wherein the one or more multi-resolution messages comprises a first message having a first resolution and a second message having a second resolution, wherein the first resolution is higher than the second resolution;

means for transmitting a first signal to query a broadcast reception capability of a base station in response to receiving the broadcast signal from the broadcast transmitter;

means for receiving a second signal indicating the broadcast reception capability of the base station; and means for communicating, with the base station, based at least in part on the broadcast reception capability of the base station.

35. The apparatus of claim 34, further comprising:
means for decoding at least one of the one or more multi-resolution messages based at least in part on receiving the broadcast signal from the broadcast transmitter; and means for determining that a data rate associated with the broadcast signal is less than a threshold based at least in part on decoding the at least one of the one or more multi-resolution messages, wherein transmitting the second signal is based at least in part on the determining.

36. The apparatus of claim 34, wherein receiving the second signal further comprises:
means for receiving, from the base station, the second signal indicating that the base station comprises a capability to receive the broadcast signal from the broadcast transmitter.

37. The apparatus of claim 36, further comprising:
means for determining a link quality between the base station and the user equipment based at least in part on receiving the second signal; and means for selecting the base station for reception of the broadcast signal based at least in part on the determined link quality, wherein communicating with the base station is based at least in part on the selecting.

38. The apparatus of claim 34, wherein means for receiving the second signal further comprises:
means for receiving, from the base station, the second signal indicating that the base station is incapable of receiving the broadcast signal from the broadcast transmitter.

39. The apparatus of claim 38, further comprising:
means for transmitting, to a second base station, a third signal to query the broadcast reception capability of the second base station; and means for receiving, from the second base station, a fourth signal indicating that the second base station comprises a capability to receive the broadcast signal from the broadcast transmitter.

40. The apparatus of claim 39, further comprising:
means for determining a first link quality between the base station and the user equipment based at least in part on receiving the second signal;

means for determining a second link quality between the second base station and the user equipment based at least in part on receiving the fourth signal; and means for selecting the base station for reception of the broadcast signal based at least in part on the first link quality and the second link quality, wherein the second base station relays the broadcast signal to the base station.

41. The apparatus of claim 40, wherein the first link quality is greater than the second link quality.

42. The apparatus of claim 39, further comprising:
means for determining a link quality between the second base station and the user equipment based at least in part on receiving the fourth signal; and means for performing a handover procedure to establish a connection with the second base station based at least in part on the link quality satisfying a threshold.

43. The apparatus of claim 39, wherein the first signal and the third signal are a same signal.

44. The apparatus of claim 39, wherein the first signal and the third signal are different signals.

45. The apparatus of claim 34, further comprising:
means for transmitting, to a central entity, a third signal to query the broadcast reception capability of the base station, wherein the third signal comprises an indication of a link quality between the base station and the user equipment.

46. The apparatus of claim 45, wherein the means for receiving the second signal further comprises:
means for receiving, from the central entity, the second signal indicating that the base station comprises a capability to receive the broadcast signal from the broadcast transmitter.

47. The apparatus of claim 34, wherein the broadcast reception capability at the base station is based at least in part on at least one of a circuitry included in the base station, a broadcast reception quality at the base station, a current load at the base station, or a combination thereof.

48. The apparatus of claim 34, wherein a broadcast transmitter comprises a new radio broadcast transmitter and the base station comprises a new radio small cell.

49. The apparatus of claim 34, wherein a distance between a broadcast transmitter and the user equipment is greater than a distance between the base station and the user equipment.

50. The apparatus of claim 34, wherein a power of a broadcast transmitter is higher than a power of the base station.

51. The apparatus of claim 34,
wherein the means for receiving the second signal indicating the broadcast reception capability of the base station is in response to the first signal.

52. The apparatus of claim 34, wherein the broadcast reception capability at the base station is based at least in part on a circuitry included in the base station and a current load at the base station.

53. A non-transitory computer-readable medium storing code at user equipment, the code comprising instructions executable by a processor to:
receive, from a broadcast transmitter, a broadcast signal comprising one or more multi-resolution messages, wherein the one or more multi-resolution messages comprises a first message having a first resolution and a second message having a second resolution, wherein the first resolution is higher than the second resolution;

transmit a first signal to query a broadcast reception capability of a base station in response to the receipt of the broadcast signal from the broadcast transmitter;

receive a second signal indicating the broadcast reception capability of the base station; and communicate, with the base station, based at least in part on the broadcast reception capability of the base station.

54. The non-transitory computer-readable medium of claim 53, the code further comprising instructions executable by the processor to:

decode at least one of the one or more multi-resolution messages based at least in part on receiving the broadcast signal from the broadcast transmitter; and determine that a data rate associated with the broadcast signal is less than a threshold based at least in part on decoding the at least one of the one or more multi-resolution messages, wherein the processor configured to transmit the second signal is based at least in part on the determination.

55. The non-transitory computer-readable medium of claim 54, the code further comprising instructions executable by the processor to:

selecting the base station for reception of the broadcast signal based at least in part on decoding the at least one of the one or more multi-resolution messages and the broadcast reception capability at the base station, wherein the processor configured to communicate with the base station is based at least in part on selection of the base station.

56. The non-transitory computer-readable medium of claim 53, wherein the instructions executable by the processor to receive the second signal further comprises instructions executable by the processor to:

receive, from the base station, the second signal indicating that the base station comprises a capability to receive the broadcast signal from the broadcast transmitter.

57. The non-transitory computer-readable medium of claim 56, the code further comprising instructions executable by the processor to:

determine a link quality between the base station and the user equipment based at least in part on receiving the second signal; and select the base station for reception of the broadcast signal based at least in part on the determined link quality, wherein the processor configured to communicate with the base station is based at least in part on the selection.

58. The non-transitory computer-readable medium of claim 53, wherein the instructions executable by the processor to receive the second signal further comprises instructions executable by the processor to:

receive, from the base station, the second signal indicating that the base station is incapable of receiving the broadcast signal from the broadcast transmitter.

59. The non-transitory computer-readable medium of claim 58, the code further comprising instructions executable by the processor to:

transmit, to a second base station, a third signal to query the broadcast reception capability of the second base station; and receive, from the second base station, a fourth signal indicating that the second base station comprises a capability to receive the broadcast signal from the broadcast transmitter.

60. The non-transitory computer-readable medium of claim 59, the code further comprising instructions executable by the processor to:

determine a first link quality between the base station and the user equipment based at least in part on receiving the second signal;

determine a second link quality between the second base station and the user equipment based at least in part on receiving the fourth signal; and select the base station for reception of the broadcast signal based at least in part on the first link quality and the second link quality, wherein the second base station is to relay the broadcast signal to the base station.

61. The non-transitory computer-readable medium of claim 60, the code further comprising instructions executable by the processor to:

determine a link quality between the second base station and the user equipment based at least in part on receiving the fourth signal; and perform a handover procedure to establish a connection with the second base station based at least in part on the link quality satisfying a threshold.

62. The non-transitory computer-readable medium of claim 53, the code further comprising instructions executable by the processor to:

transmit, to a central entity, a third signal to query the broadcast reception capability of the base station, wherein the third signal comprises an indication of a link quality between the base station and the user equipment.

63. The non-transitory computer-readable medium of claim 53, wherein the broadcast reception capability at the base station is based at least in part on at least one of a circuitry included in the base station, a broadcast reception quality at the base station, a current load at the base station, or a combination thereof.

64. The non-transitory computer-readable medium of claim 53, wherein the broadcast reception capability at the base station is based at least in part on a circuitry included in the base station and a current load at the base station.

65. The non-transitory computer-readable medium of claim 53, the code further comprising instructions executable by the processor to:

decode at least one of the one or more multi-resolution messages based at least in part on receiving the broadcast signal from the broadcast transmitter; and determine that a data rate associated with the broadcast signal is less than a threshold based at least in part on decoding the at least one of the one or more multi-resolution messages, wherein the processor configured to transmit the second signal is based at least in part on the determination.

* * * * *